United States Patent
Johansen et al.

(10) Patent No.: US 9,806,668 B2
(45) Date of Patent: Oct. 31, 2017

(54) PHOTOVOLTAIC MOUNTING SYSTEM FOR TILED ROOFS

(71) Applicant: SolarCity Corporation, San Mateo, CA (US)

(72) Inventors: Emil Johansen, San Rafael, CA (US); Martin Seery, San Rafael, CA (US)

(73) Assignee: SolarCity Corporation, San Mateo, CA (US)

( * ) Notice: Subject to any disclaimer, the term of this patent is extended or adjusted under 35 U.S.C. 154(b) by 0 days.

(21) Appl. No.: 14/855,273

(22) Filed: Sep. 15, 2015

(65) Prior Publication Data

US 2016/0087576 A1 Mar. 24, 2016

Related U.S. Application Data

(60) Provisional application No. 62/089,132, filed on Dec. 8, 2014, provisional application No. 62/053,918, filed on Sep. 23, 2014.

(51) Int. Cl.
*E04D 13/18* (2014.01)
*H02S 20/25* (2014.01)
(Continued)

(52) U.S. Cl.
CPC ............ *H02S 20/25* (2014.12); *E04D 1/36* (2013.01); *E04D 13/147* (2013.01);
(Continued)

(58) Field of Classification Search
CPC ...................................................... H02S 20/25
See application file for complete search history.

(56) References Cited

U.S. PATENT DOCUMENTS 7,506,477 B2 * 3/2009 Flaherty ............... E04D 1/08
136/244
8,713,858 B1 * 5/2014 Xie ....................... E04D 13/147
52/58
(Continued)

FOREIGN PATENT DOCUMENTS

DE 20005590 U1 6/2000
JP 2005098094 A 4/2005
(Continued)

OTHER PUBLICATIONS

International Search Report mailed on Mar. 22, 2016 for International Patent Application No. PCT/US2015/064552, 5 pages.
(Continued)

*Primary Examiner* — Elizabeth A Quast
(74) *Attorney, Agent, or Firm* — Kilpatrick Townsend & Stockton LLP

(57) ABSTRACT

A photovoltaic mounting system for tile roofs is disclosed. In one embodiment, mounting bracket is attached to a roof deck and passes through a flashing support and flexible flashing that mimics the contour of the adjacent roof tiles. In other embodiments, a tile hook passes through partial or full tile replacement flashing. A plug or other structure blocks the space around the tile hook preventing the ingress of pests and debris under the flashing and surrounding tiles. Additional photovoltaic module mounting hardware, including sections of rails and frame mounts are attached either the mounting bracket or tile hook.

14 Claims, 29 Drawing Sheets

(51) Int. Cl.
    *E04D 13/147*  (2006.01)
    *E04D 1/36*    (2006.01)
    *H02S 20/22*   (2014.01)
    *F24J 2/52*    (2006.01)

(52) U.S. Cl.
    CPC ........... *F24J 2/5203* (2013.01); *F24J 2/5245* (2013.01); *F24J 2/5247* (2013.01); *F24J 2/5254* (2013.01); *F24J 2/5258* (2013.01); *H02S 20/22* (2014.12); *Y02B 10/12* (2013.01); *Y02B 10/20* (2013.01); *Y02E 10/47* (2013.01)

(56) References Cited

U.S. PATENT DOCUMENTS

| | | | | |
|---|---|---|---|---|
| 8,776,456 | B1* | 7/2014 | Schrock | F24J 2/5245 |
| | | | | 126/623 |
| 2005/0044808 | A1* | 3/2005 | Prenn | E04D 13/03 |
| | | | | 52/200 |
| 2010/0281793 | A1* | 11/2010 | McPheeters | E04D 13/1476 |
| | | | | 52/173.1 |
| 2014/0175244 | A1* | 6/2014 | West | F24J 2/5205 |
| | | | | 248/316.7 |
| 2014/0331593 | A1 | 11/2014 | Okada et al. | |
| 2015/0075100 | A1* | 3/2015 | West | E04B 1/665 |
| | | | | 52/506.05 |
| 2015/0143760 | A1* | 5/2015 | Daniels | E04D 13/00 |
| | | | | 52/173.1 |
| 2015/0155823 | A1 | 6/2015 | West et al. | |
| 2016/0134230 | A1* | 5/2016 | Meine | F24J 2/52 |
| | | | | 52/698 |

FOREIGN PATENT DOCUMENTS

| | | | | |
|---|---|---|---|---|
| TW | FR 2934619 A3 * | 2/2010 | | E04D 1/16 |
| WO | 2009/129799 A1 | 10/2009 | | |

OTHER PUBLICATIONS

Written Opinion mailed on Mar. 22, 2016 for International Patent Application No. PCT/US2015/064552, 6 pages.

* cited by examiner

PHOTOVOLTAIC MOUNTING SYSTEM FOR TILED ROOFS

CROSS-REFERENCE TO RELATED APPLICATIONS

This claims priority to provisional patent application No. 62/089,132, filed Dec. 8, 2014, and 62/053,918, filed Sep. 23, 2014, the disclosures of which are hereby incorporated by reference in their entirety.

FIELD OF THE INVENTION

The instant invention relates generally to photovoltaic mounting systems ("PV" or "solar") and in particular to PV mounting systems for tiled roofs.

BACKGROUND

Solar power is becoming increasingly popular as a source of renewable energy. Advances in panel efficiency and manufacturing techniques have driven down the cost per kilowatt and have led to double-digit annual growth in solar installs and projections of even greater growth in the future. Solar energy's recent success notwithstanding, the solar industry must continue to innovate and reduce costs so that it can continue to offer a value proposition to its customers relative to fossil fuel based power.

Solar systems have relatively few components. The primary ones are the panels, mounting system, inverters, electrical interfaces to existing grid power, and the labor involved installation. Therefore, a reduction in any one of these will have a measurable impact on the cost per watt of solar. Solar mounting systems in particular effect not only hard costs associated with solar system, but also potentially soft costs such as labor, crew size and installation times.

Tile roofs present a unique challenge for installing photovoltaic panels as compared to shingled or composite shingle roofs, primarily because tiles are neither flat nor flexible. Also, they typically must be moved out of the way or completely removed to attach the requisite mounting hardware to the underlying roof or roof rafter to support a solar array, whereas composite shingles can simply be drilled through. Therefore, known solutions for mounting PV panels onto tiled roofs are often relatively more expensive as well as more time consuming compared to the systems used to install solar panels on shingle roofs.

DETAILED DESCRIPTION

The following description is intended to convey a thorough understanding of the embodiments described by providing a number of specific embodiments and details involving PV mounting hardware for sloped tile roofs. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Figure 1:
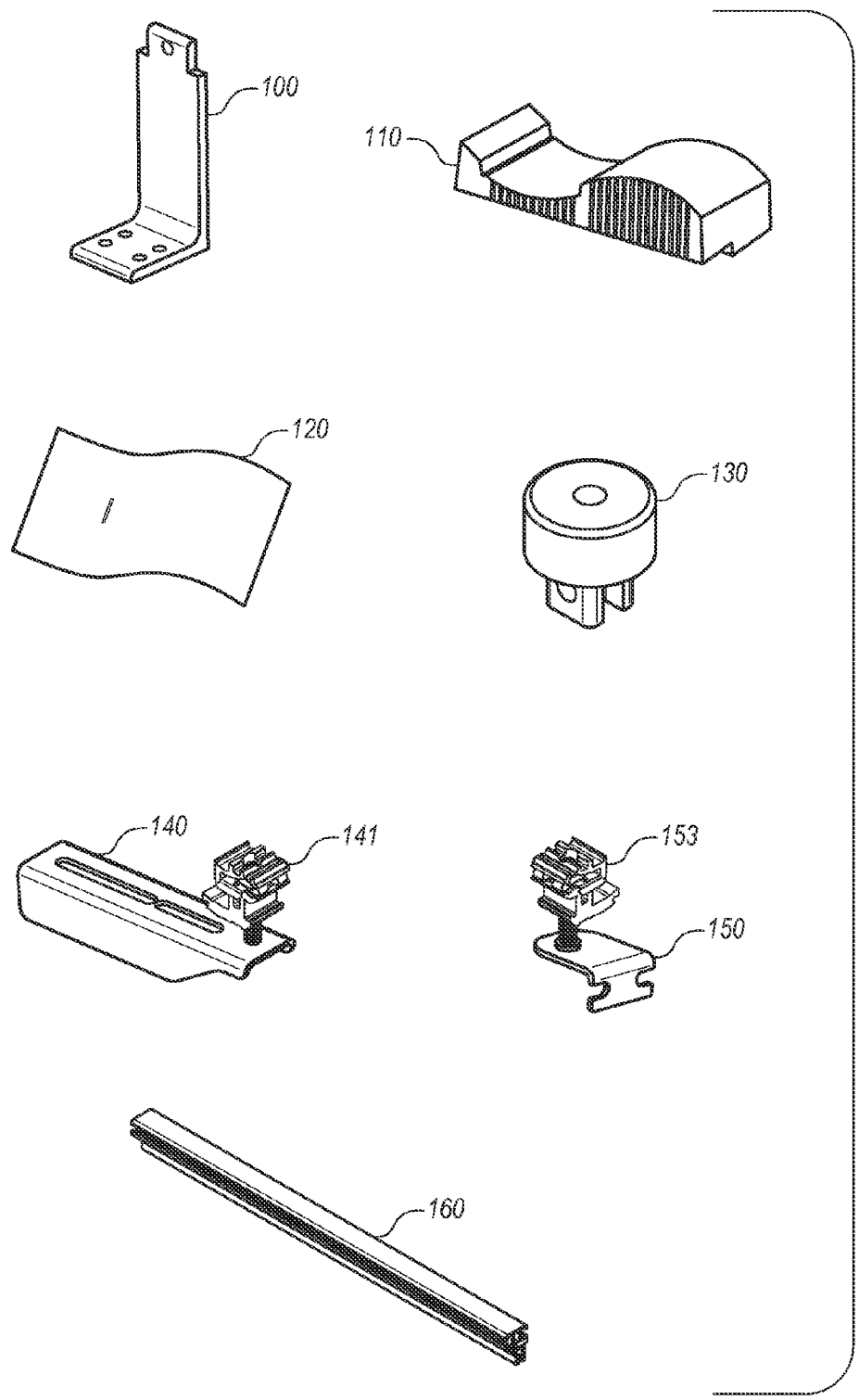
FIG. 1 illustrates components of a photovoltaic mounting system according to an exemplary embodiment of the invention.

FIG. 1 shows the components of a photovoltaic mounting system according to various embodiments of the invention. As shown in FIG. 1, these components include mounting bracket 100, flashing support 110, and flexible flashing 120. As will be shown in greater detail herein, these three components alone are sufficient to provide a mounting structure on which PV mounting systems can be attached to support a commercial or residential PV array. Additional system components depicted in FIG. 1 include bracket adapter 130, top arm assembly 140 with integral connector 141, rail bracket assembly 150 with integral connector 153, and connecting rail 160. In various embodiments, combinations of the elements depicted in FIG. 1 are used to securely and quickly attach photovoltaic panels into a complete array over an existing tile roof.

Figure 2:
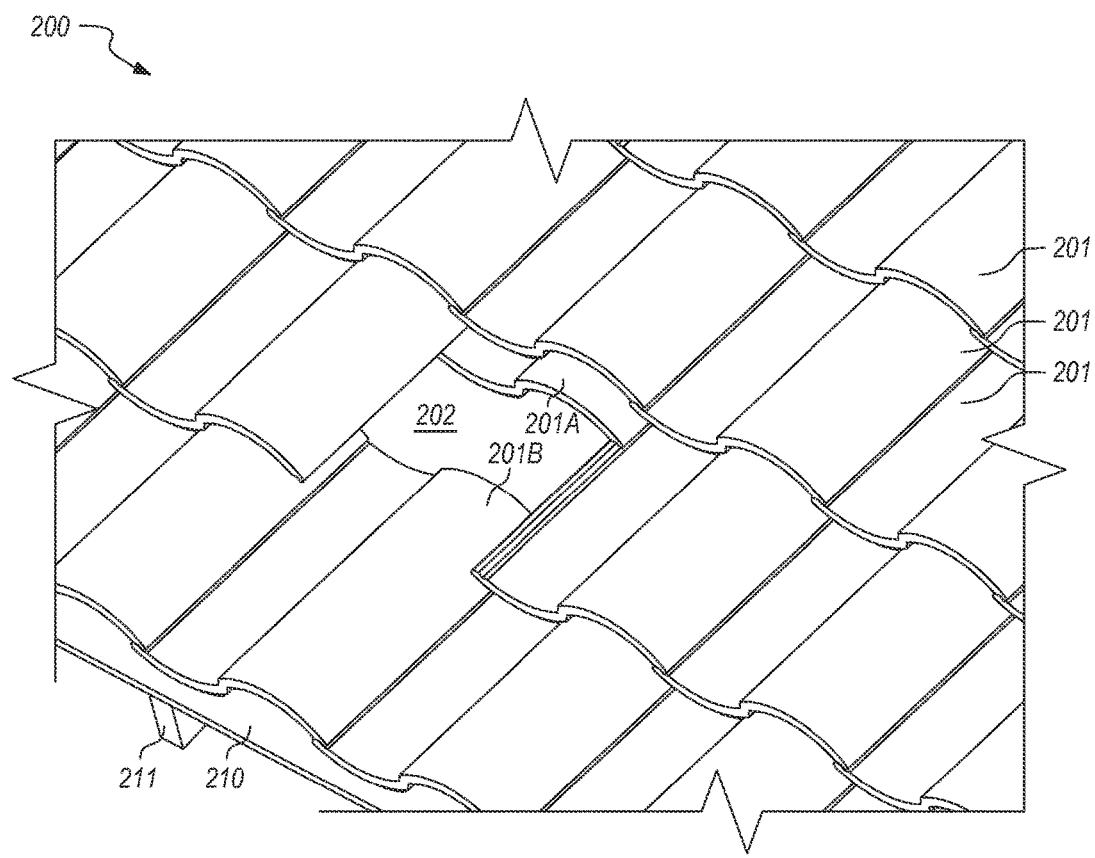
FIG. 2 is a perspective view of a section of curved tile roof with a tile moved to accommodate a photovoltaic mounting system according to an exemplary embodiment of the invention.

Referring now to FIG. 2, this Figure illustrates conventional tile roof 200 comprising individual tiles 201 installed on a plywood or composite roof deck 210 supported by one or more roof rafters 211. In FIG. 2 individuals tiles 201 overlap one another in both the horizontal and vertical directions (i.e., across roof and up roof) as is well known in the roofing arts. Although not shown in FIG. 2, roof surface 210 is frequently covered with tarpaper and/or other vapor/moisture blocking material to further weatherproof and insulate roof surface 210 and the structure beneath it from the elements. Typically, this material would be visible in gap 202 created by sliding tile 201A up-roof. Alternatively, a horizontal roof batten may be seen when sliding tile 201A up-roof. FIG. 2, when tile 201A is in its normal position, it covers a portion of down-roof tile 201B so that water running down the roof will continue down to the gutter rather than flowing under the roof tiles.

Conventionally, there is a lip or protrusion on the underside of each tile that orients the tile with respect to the next down-roof tile, while the up-roof tile is devoid of any such feature. In FIG. 2, tile 201A, has been partially slid in the up-roof direction relative to tile 201B to expose opening 202. In various embodiments, this may be the first step in installing the photovoltaic mounting system shown in FIG. 1.

Figure 3A:
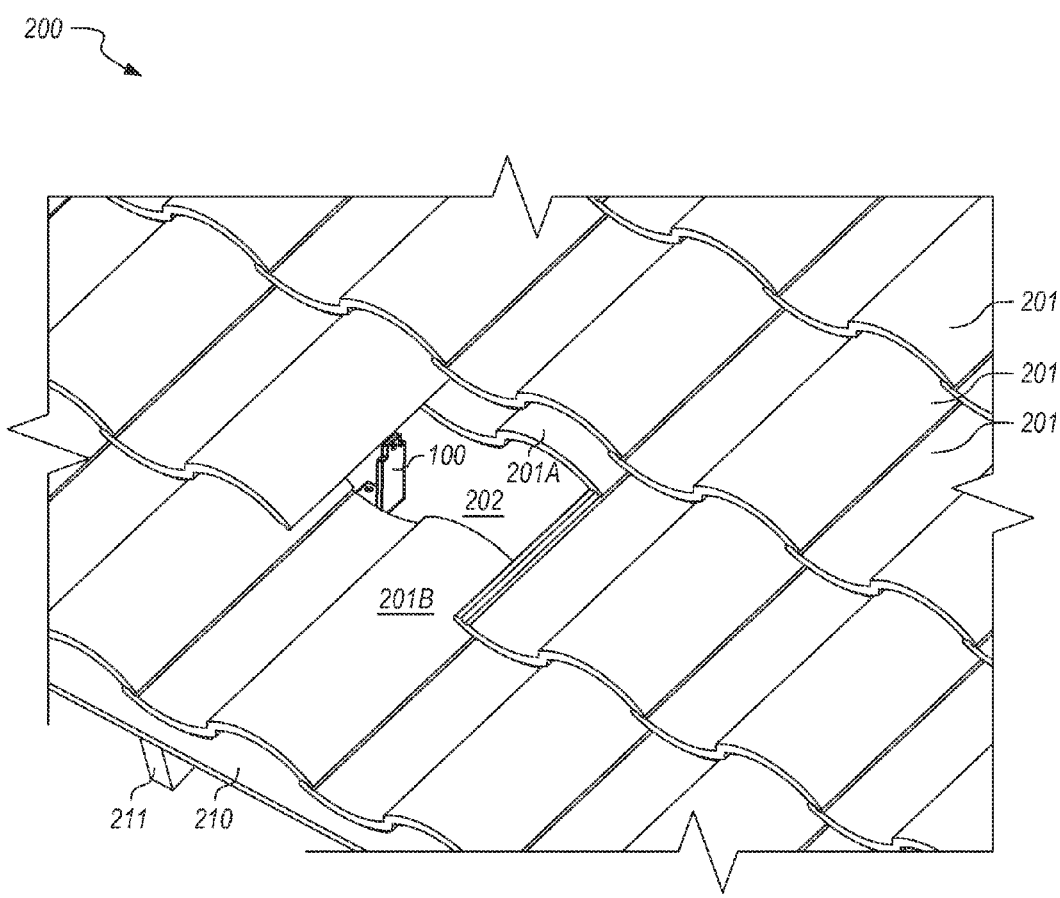
FIG. 3A is a perspective view of a section of curved tile roof including a mounting bracket for a photovoltaic mounting system according to an exemplary embodiment of the invention.
Figure 3B:
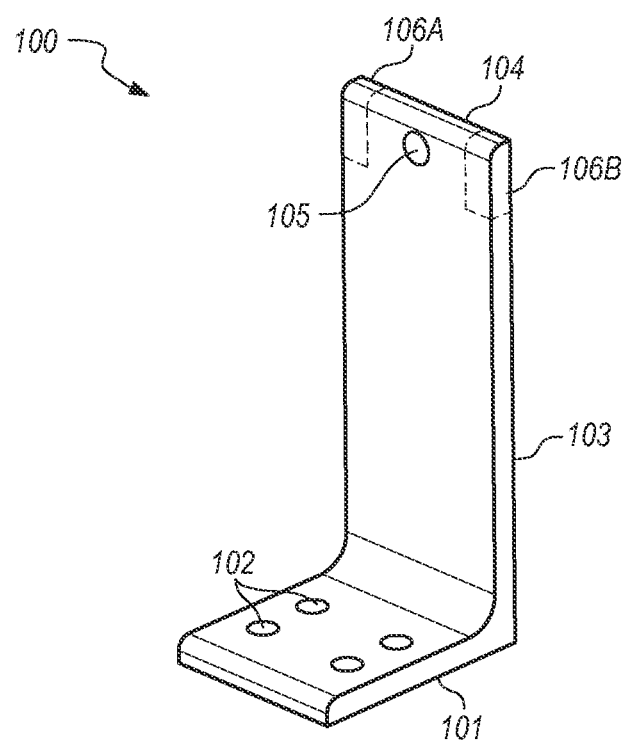
FIG. 3B is a perspective view of another mounting bracket for a photovoltaic mounting system according to an exemplary embodiment of the invention.

Referring now to FIG. 3A, this Figure shows roof 200 depicted in FIG. 2, with an exemplary mounting bracket such as L-bracket 100 installed in opening 202 created by sliding tile 201A up and under the adjacent up-roof tile. FIG. 3B is a close-up perspective view of L-bracket 100. Bracket 100 is installed so that base portion 101 faces the roof deck, preferably, though not necessarily, over a roof rafter so that the screws or lag bolt(s) holding down bracket 100 are solidly anchored. As shown in FIG. 3A, bracket 100 may be installed so that the long part of the L, vertical portion 103, points upwards (i.e., away from roof surface) and the wide part runs North-South (i.e., up and down the roof).

In various embodiments, L-bracket 100 includes base portion 101 with one or more integral mounting holes 102 that allow a lag bolt, screw or other mechanical fastener to pass through so that base portion 101 can be rigidly attached to underlying roof surface 210. In various embodiments L-bracket 100 will be attached to roof surface 210 under a tile that is above one of roof rafters 211 to provide additional resistance to pull out.

With reference to FIG. 3B, in various embodiments L-bracket 100 may include vertical portion 103 that terminates in flange 104 that includes one or more attachment holes 105 for attaching other PV panel mounting hardware to secure a photovoltaic panel above the tile roof. Unlike bracket 100 shown in FIG. 3A, bracket 100 in FIG. 3B has uniform flange 104, that is, it is not tapered. Dotted lines have been added to FIG. 3B to show where material at areas 106B may be removed to taper flange 104. It should be appreciated that the L-brackets of FIGS. 3A and 3B are exemplary only. Various embodiments of the invention may utilize brackets having other shapes without departing from the spirit or scope of the invention. For example, in various embodiments, top or roof-facing portion of vertical portion 103 may not be notched on both sides of opening 105 as shown in FIG. 3B. Also, flange 104 may be bent perpendicular to vertical portion 103 to be parallel to base portion 102 depending on the desired attachment mechanism for subsequent elements of the PV mounting system.

Figure 4:
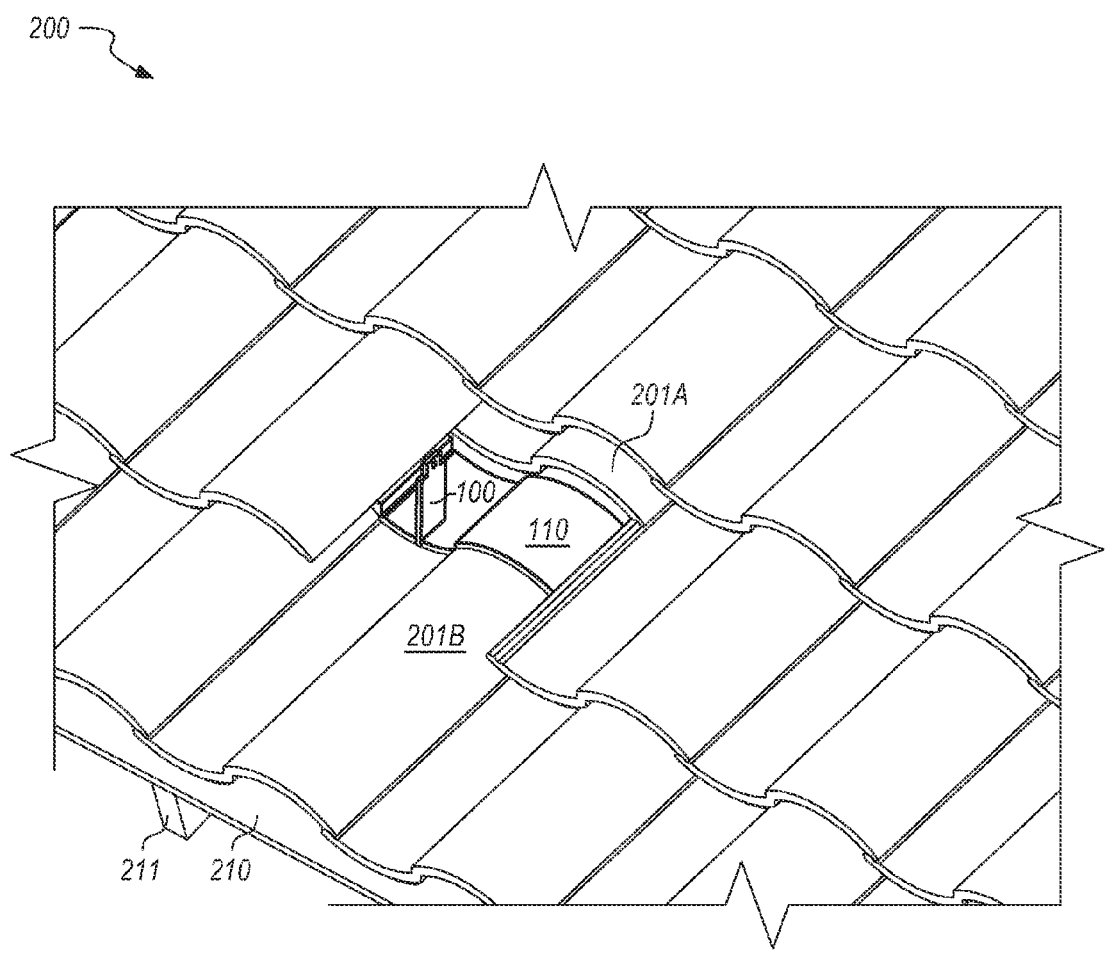
FIG. 4 is a perspective view of a section of curved tile roof including a flashing support member for a photovoltaic mounting system according to an exemplary embodiment of the invention.

FIG. 4 illustrates roof 200 of FIGS. 2 and 3A including flashing support 110 placed in opening 202 created by partially sliding tile 201A up-roof under the next row of tiles. Flashing support 110 is shown in greater detail in FIG. 1. In various embodiments, flashing support 110 may be formed of semi-rigid foam or foam-like material and shaped to fit the various contours of the underside of tile 101A as well as portions of one or more surrounding tiles. In various other embodiments, flashing support 110 may be formed out of another suitable lightweight, durable material that is soft enough to be punctured by L-bracket 100 but rigid enough to generally hold its shape. In various embodiments, flashing support 110 is installed into opening 202 by pushing it down over mounting bracket 100 so that mounting bracket flange 104 punches through the bottom surface of flashing support 110 and allows flashing support 110 to slide down until it is flush with roof surface 210 at the bottom of opening 202. In various embodiments, flashing support 110 will be preformed to substantially match the curvature of the underside of tile 201A that it is displacing. In other embodiments, flashing support 110 may be made of a malleable material to allow it to be deformed into the curvature of the underside of tile 201A.

Figure 5:
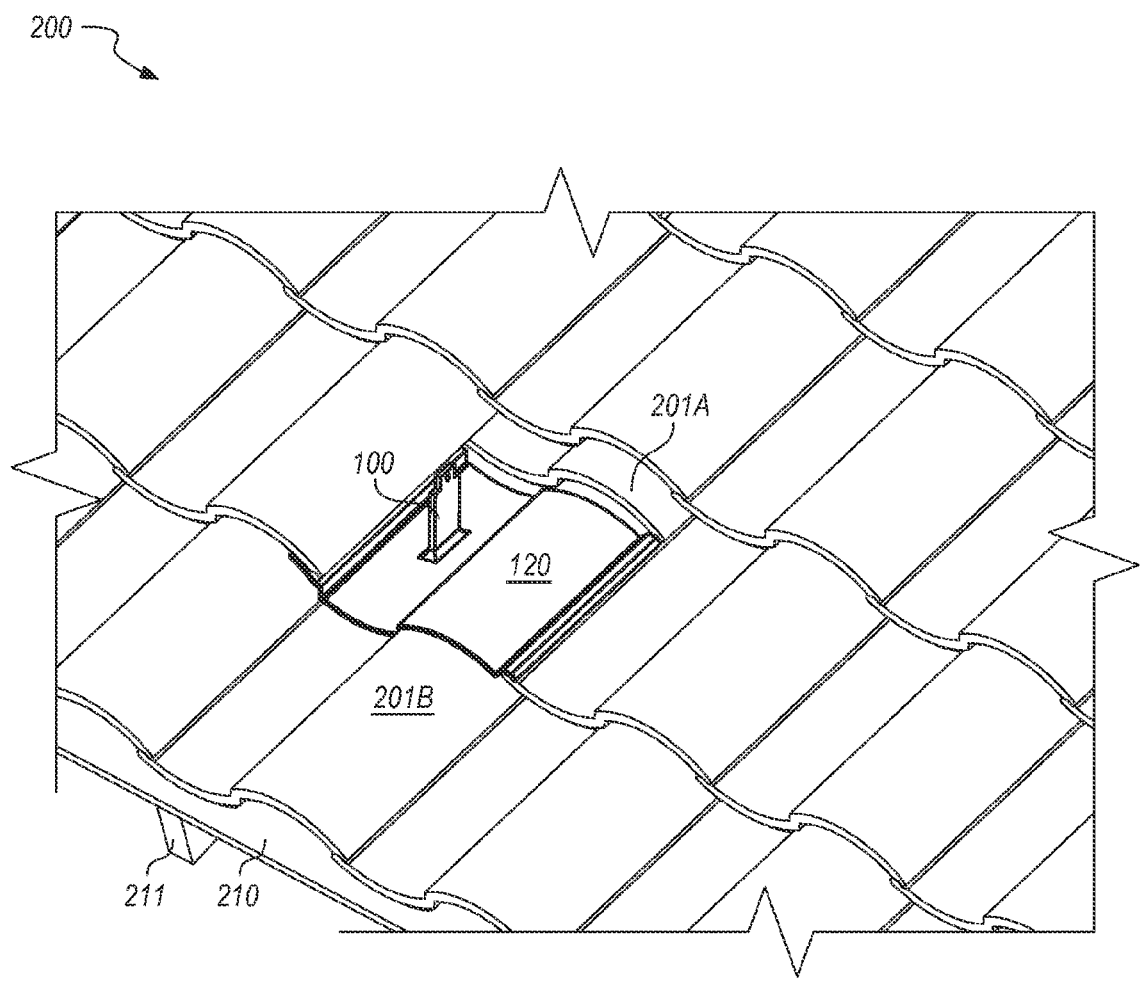
FIG. 5 is a perspective view of a section of curved tile roof including a flashing member for a photovoltaic mounting system according to an exemplary embodiment of the invention.

Referring now to FIG. 5, this Figure depicts roof 200 of the previous Figures with flashing material 120 installed over flashing support 110 in opening 202. In various embodiments, flashing material 120 is composed of a flexible material such as rubber, silicone rubber, or other waterproof, rubberized material. In other embodiments, it may be rigid. In various embodiments, flashing material 120 is sufficiently supple to allow it to conform to the curvature of flashing support 110 and the down-roof and up-roof tiles with respect to opening 202. In various embodiments flashing material 120 may be laminated or include one or more supple horizontal metal strips, for example along the up-roof and down-roof edges that assist in holding flashing 120 in the shape dictated by flashing support 110 and curvature of the surrounding tiles. In various embodiments, flashing 120 may also laminate one or more rigid metal rods that are oriented in the vertical direction to prevent flashing 120 from caving in or developing low spots that would allow water to stand, thereby providing rigidity in the Y direction (line going from roof ridge to gutter), while allowing it to be bendable in the X direction (line going from left side of roof to right side of roof) and able to accommodate variations in Z direction (normal to roof surface) elevation along the curve of adjacent tiles. It is preferable flashing 120 be large enough to allow it to extend under a portion of up-roof tile 201A, over a portion of down-roof tile 201B, under the left-side tile (convex) and over the right side tile (concave) so that water falling directly on flashing 120 or running down the roof over flashing 120 continues it's downward, gravity-guided path without leaking under flashing 120 to roof surface 210.

Flashing 120 depicted in FIGS. 1 and 5 is shown with an aperture that allows it to be slid over mounting bracket 100 there by creating an upward tapered, water-tight seal around bracket 100 to prevent the ingress of water under normal atmospheric conditions. In various embodiments, and as seen more clearly in FIG. 5, the aperture may comprise a boot-like raised portion with one or more stepped ridges that allow flashing 120 to accommodate different bracket locations within opening 202, while still covering the entire opening, and without unduly stretching the aperture, thereby compromising its ability to make a watertight seal around the mounting bracket 100. The aperture enables flashing 120 to be used regardless of whether the bracket protrudes from the concave (lower) or convex (higher) portion of the tile pattern by simply rotating it 180 degrees. Other embodiments may include one or more punch-outs or other similar structures that can be punched out, cut out, or pierced to allow flashing 120 to fit over the mounting bracket 100 regardless of its location relative to the surrounding tiles. In various embodiments it may be desirable to have two or more such features in different positions to accommodate a wide variety of mounting bracket locations within opening 202. The shape and size of the aperture will be dictated to at least some extent by the size and shape of mounting bracket 100. In various embodiments, flashing 120 may be roll formed in a continuous manufacturing process. In other embodiments, flashing 120 may be cut from large sheets, or even individually formed.

Figure 6:
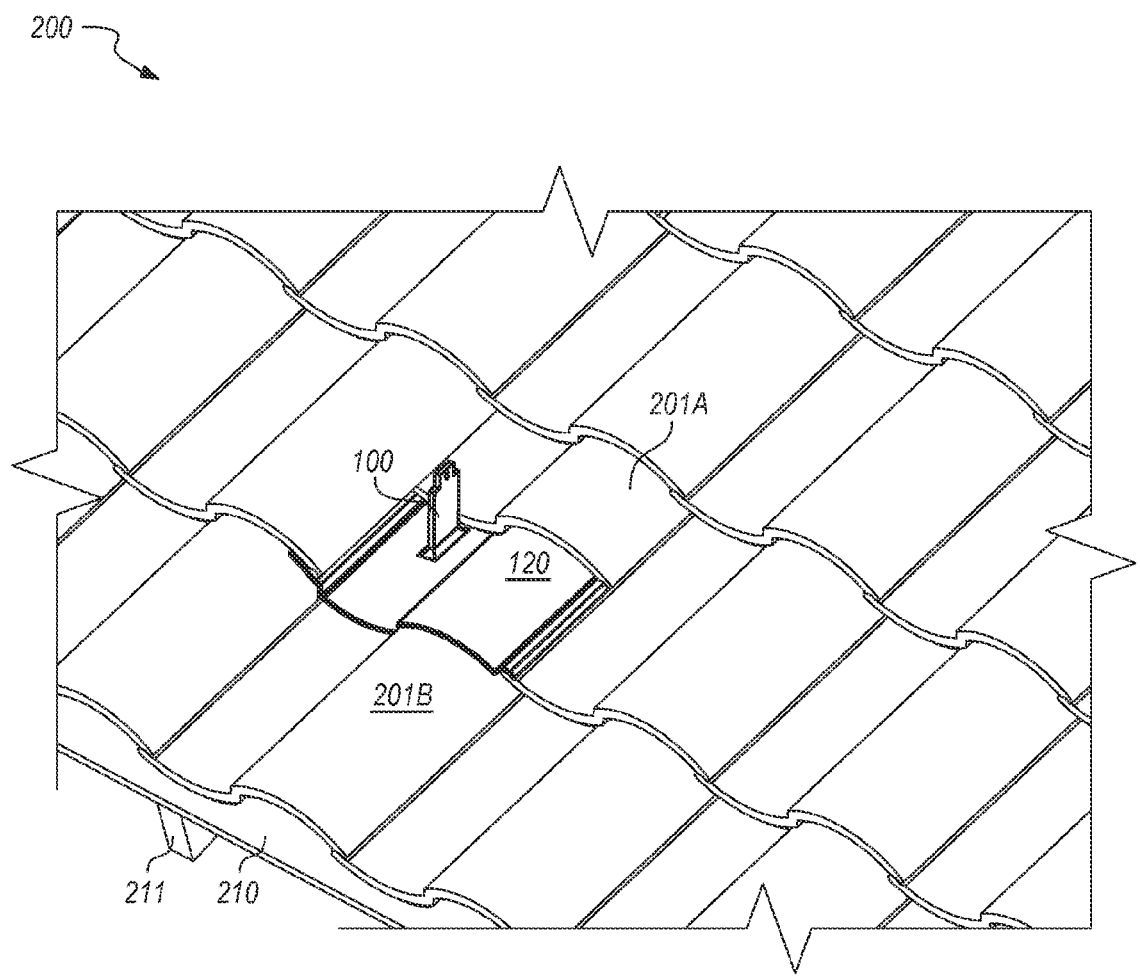
FIG. 6 is another perspective view of the flashing member of FIG. 5.

FIG. 6 shows roof 200 depicted in the previous Figures wherein tile 101A is partially returned to its original position until it rests against mounting bracket 100, covering the top portion of flashing 120, as well as, in some embodiments, a portion of flashing support 110, thereby reducing and ideally minimizing the displacement of tiles resulting from the PV mounting system according to various embodiments of the invention. This combination of bracket 100, flashing support 110, and flashing 120 may be considered an entire base assembly for attaching further PV mounting components.

Figure 7:
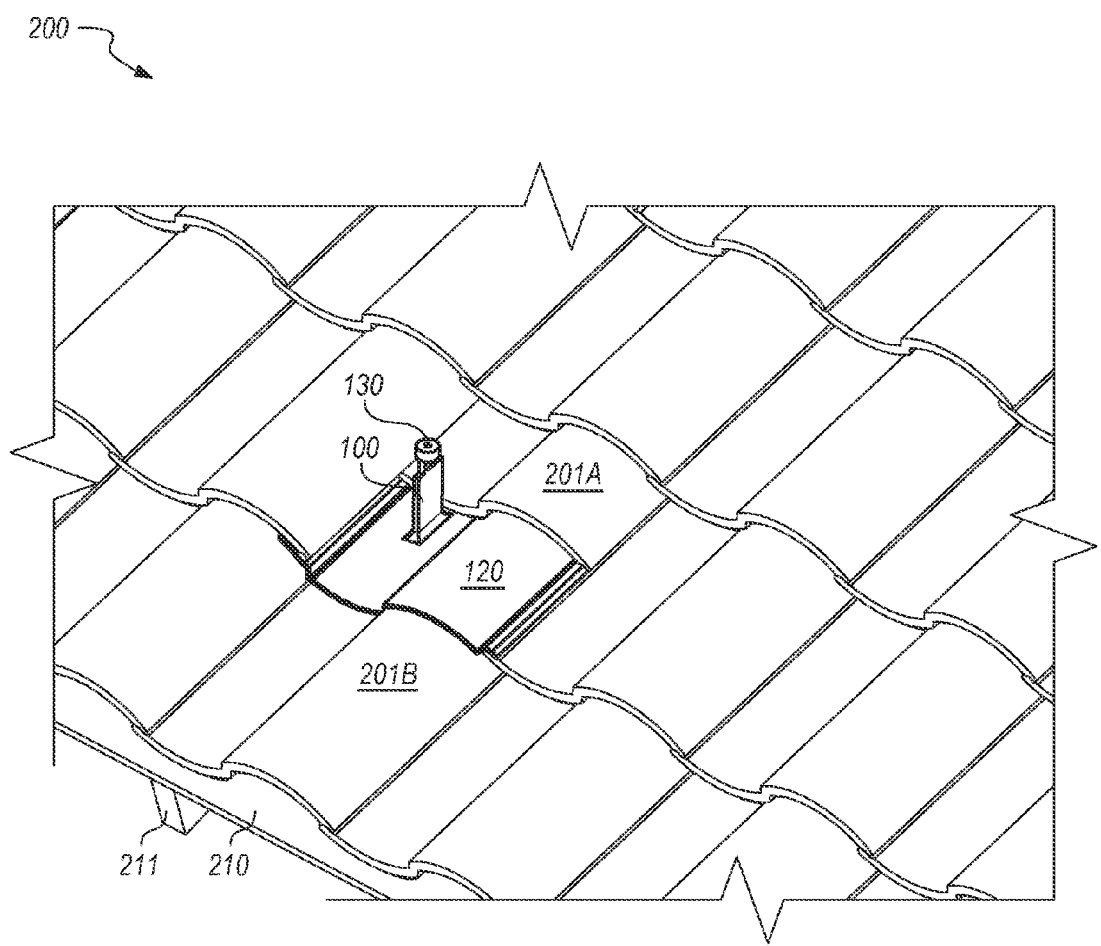
FIG. 7 is a perspective view of a section of curved tile roof including a mounting adapter according to an exemplary embodiment of the invention.

To that end, FIG. 7 illustrates the assembly shown in FIG. 6 with bracket adapter 130 attached to flange 104 of mounting bracket 100 according to at least one embodiment of the invention. In various embodiments, bracket adapter 130 may take the circular, puck-like shape depicted in FIG. 7. In various other embodiments, bracket adapter 130 may take the shape of a bolt head, or other suitable shape that allows it to be mated with a rail or other structure. In the embodiment shown in FIG. 7, adapter 130 includes a threaded top opening that allows a slotted arm or other structure for making adjustments to the location of a PV panel connector in the X direction, Y direction or both directions to be attached to adapter 130 with a restraining bolt or other threaded fastener. In various embodiments, adapter 130 has a pair of vertical flanges with an opening in each flange, thereby enabling the flanges to fit over and around either side of flange 104 of mounting bracket 100 and be bolted thereto with a standard nut and bolt.

Figure 8A:
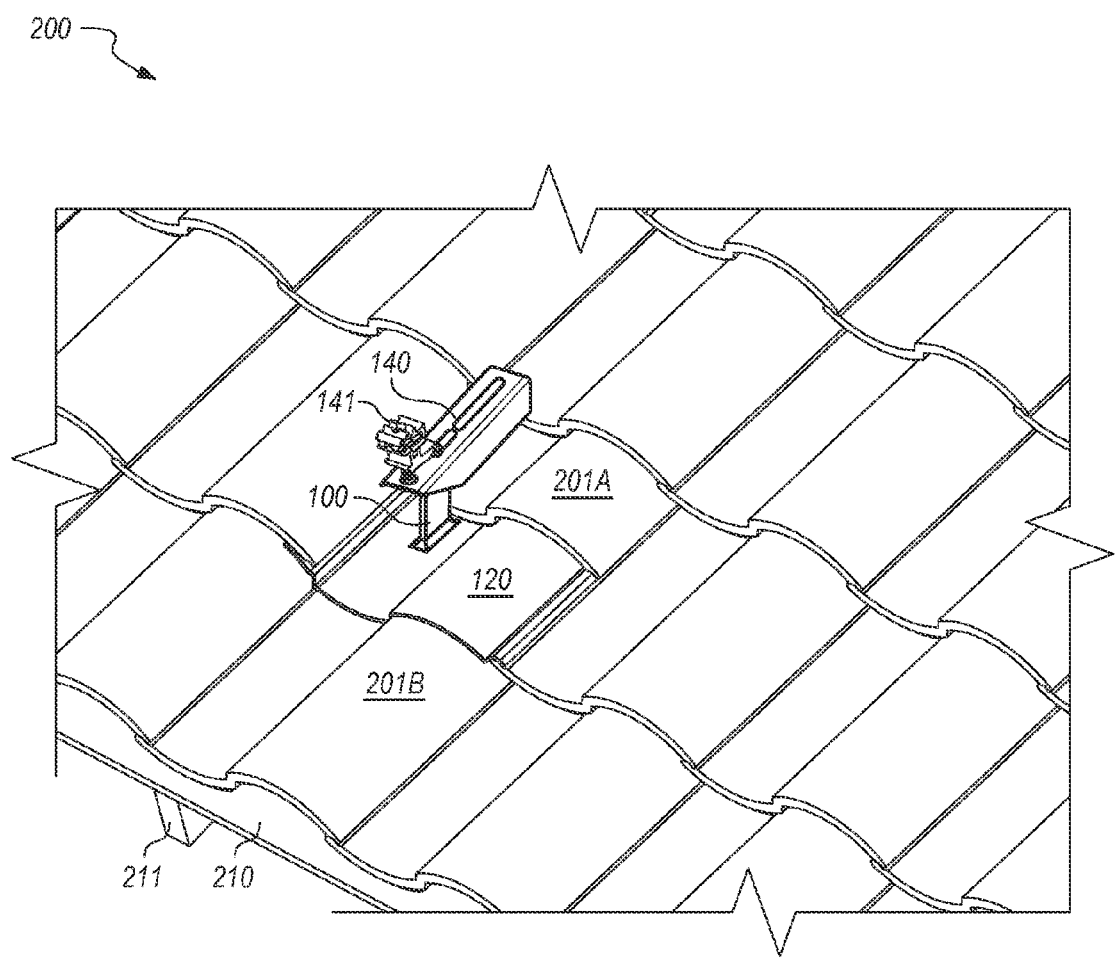
FIG. 8A is a perspective view of a section of curved tile roof including a top arm and photovoltaic module coupling device according to an exemplary embodiment of the invention.

FIG. 8A depicts roof 200 shown in the preceding Figures with top arm 140 with integral PV module connector 141 according to various embodiments of the invention. In FIG. 8A, top arm 140 includes two attachment slots in the top surface that allow module connector 141 to be moved closer to or further away from adapter 130 and then fixed in a particular position. In various embodiments, top arm 140 is fixed to adapter 130 using a screw protruding down through one of the slots into the threaded opening in the top of adapter 130. It should be appreciated that this is a design choice. This flexibility combined with the rounded geometry of adapter 130 allows top arm 140 to be rotated 360 degrees with respect to adapter 130, and by extension enables connector 141 to be moved anywhere within a circle having a radius substantially equivalent to the length of top arm 140.

Figure 8B:
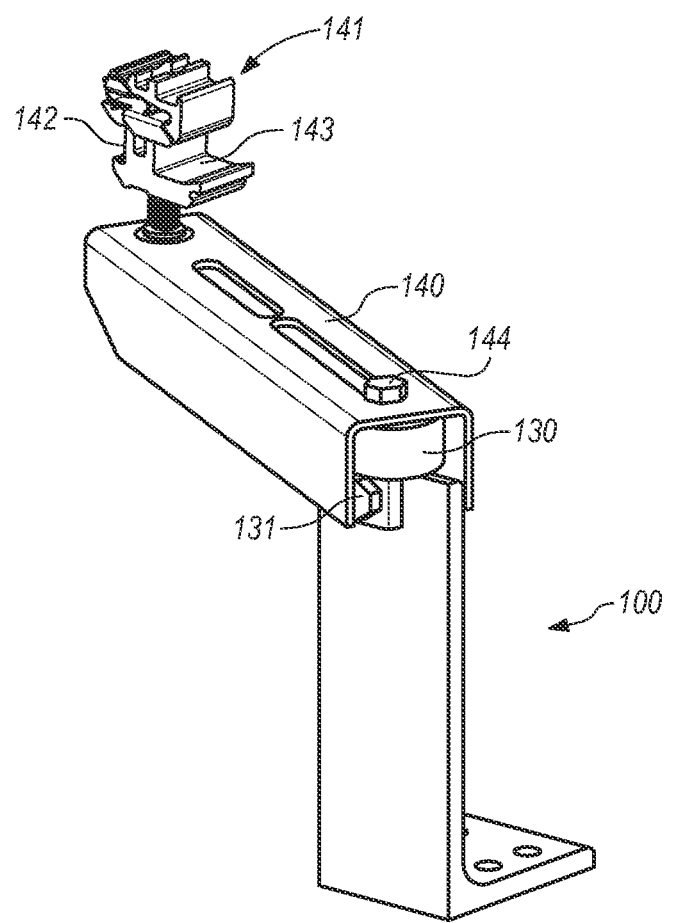
FIG. 8B is a close-up perspective view of the photovoltaic mounting system shown in FIG. 8A.

This can be seen more clearly in FIG. 8B which is a perspective view showing bracket 100, adapter 130, top arm 140, and PV module connector 141 in isolation. In various embodiments, module connector 141 may be a rock-it style connector such as that shown in FIG. 8B with short key side 142 and relatively longer tongue side 143 for interconnecting opposite-facing frames of two PV modules. Such a coupling device is described and illustrated, for example, in commonly assigned U.S. patent application Ser. No. 14/615, 320, Publication No. 2015/0155823-A1, the disclosure of which is herein incorporated by reference in its entirety. However, in other embodiments, connector 141 may be a clamping connector, gripping connector or other suitable module frame connector capable of detachably connecting the frames of two opposite facing PV modules.

Figure 9:
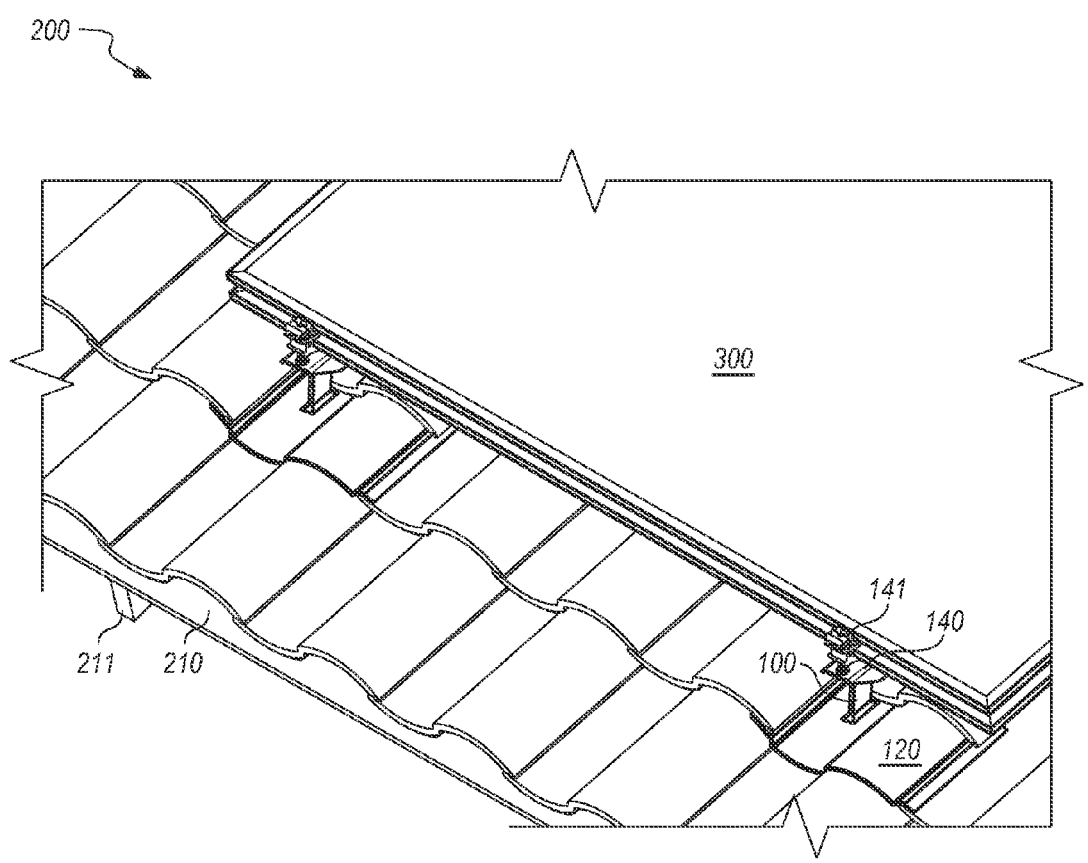
FIG. 9 is a perspective view of a photovoltaic module installed on a section of curved tile roof with a photovoltaic mounting system according to an exemplary embodiment of the invention.

FIG. 9 depicts PV panel 300 connected to a pair of module connectors 141 attached to pair of respective top arms 140, which in turn are connected to pair of respective mounting brackets 100 via pair of adapters 130, all according to various embodiments of the invention. PV module 300 is depicted as having a groove in the outward facing side of the frame that enables the frame to be mated with a rock-it style connector such as connector 141. In other embodiments, the frame of PV panel 300 may be smooth or groove-less and connector 141 may clamp down on, grab, or otherwise detachably restrain PV module 300, either directly, or through other intervening hardware as shown in the exemplary embodiments depicted herein.

Figure 10:
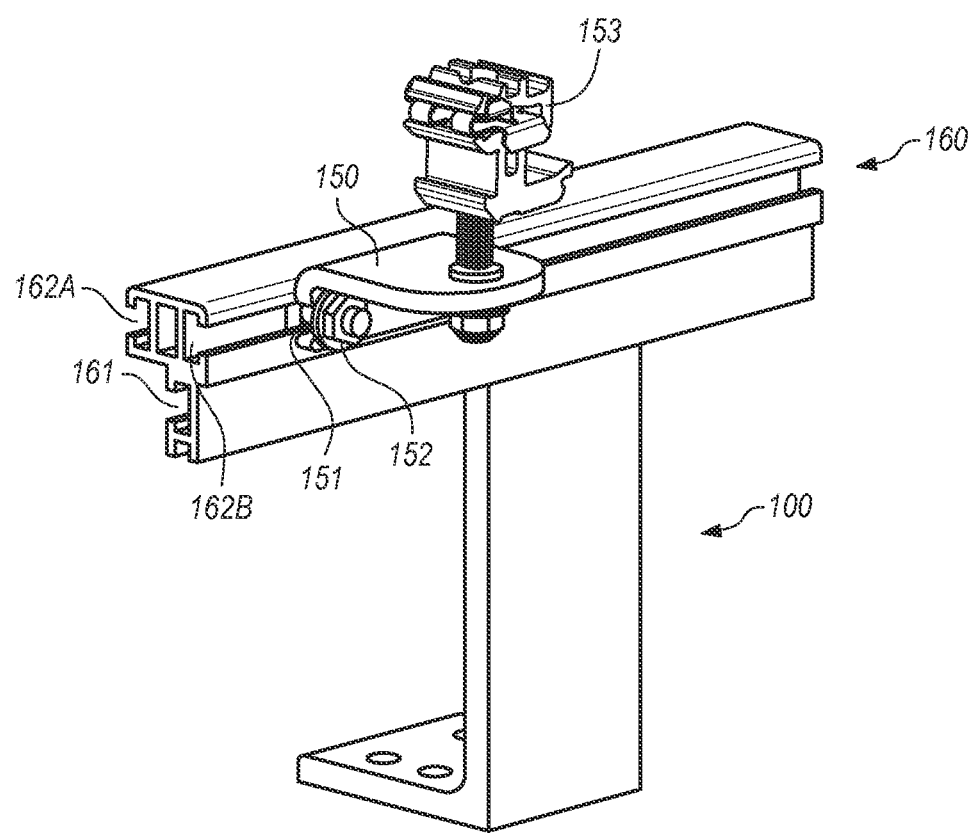
FIG. 10 is a close-up perspective view of an alternative photovoltaic mounting system according to an exemplary embodiment of the invention.

FIG. 10 depicts an alternative assembly including rail bracket 150 with rock-it connector 153 for use with section of cantilever rail 160. In various embodiments of the invention, instead of adapter 130 and top arm 140 shown in FIGS. 8A and 8B, in the assembly shown in FIG. 10, section of cantilever 160 is connected directly to the mounting bracket 100 via a T-bolt and nut (not shown) or other suitable fastener that passes through the hole 105 in the flange 104 of the mounting bracket 100. In various embodiments, rail 160 may include lower channel 161 that spans the entire length of rail 160 and that is sized to receive and retain the head of a T-bolt, allowing cantilever rail 160 to be slid in the Y direction (perpendicular to direction of opening 105) as necessary to achieve the desired positioning of connector 151 with respect to one or more PV modules before being tightened into place on bracket 100 with a nut (not shown). In various embodiments, rail 160 may include a pair of opposite facing upper channels 162A, 16B spanning the entire length of rail 161 and also open at each end for mounting a PV module connector.

In various embodiments, rail bracket 150 may be connected to one of grooves 162A, 162B using T-bolt 151 and nut 152. Bracket 150 may include a pair of C-shaped openings on either side that enable bracket 150 to be attached to rail 160 using one or more T-bolts or other attaching mechanism. In various embodiments, the head of such a T-bolt may be slid into either end of either of upper channels 161A, 161B until it engages one of the C-shaped openings of rail bracket 150. Nut 152 may then be attached to bolt 151 to hold rail bracket 150 at the desired location along rail 160. As depicted in FIG. 10, rail bracket 150 may include an integral rock-it type module connector 153 for securing one or more PV modules to mounting bracket 100 through connector 153, bracket 150, rail 160, and L-bracket 100. It should be appreciated, however, that as with the exemplary embodiment depicted in FIGS. 8A and 8B, other types of PV module connectors such as clamping connectors, grabbing connectors or other suitable connectors may be utilized with rail bracket 150 according to various embodiments of the invention.

Reference will now be made to all of the preceding Figures to describe an exemplary installation process for the photovoltaic mounting system according to various embodiments of the invention on an existing sloped tile roof. First, a tile is located that is over a roof rafter or otherwise at a desired mounting point, such as tile 201A. That tile is slid up-roof to expose roof surface 210 at opening 202. A mounting bracket such as L-bracket 100 is then installed through the roof surface 210 in opening 202 by pre-drilling one or more pilot holes and screwing in two or more lag bolts and/or screws into the pilot holes via holes 102 in the base of mounting bracket 100. Next, flashing support 100 is pressed down over upward facing flange 104 of mounting bracket 100 so that the orientation of the curve of flashing support 110 matches the curve of roof tile 201A and so that when tile 201A is slid back down-roof, its contours match that of flashing support 110 and so that it is not obstructed by flashing support 110.

Next, flexible flashing material 120 is also slid over flange 104 to cover flashing support 110 and to completely cover opening 202. In various embodiments, flashing 120 has at least one integral aperture surrounded by a boot to maximize positional flexibility with respect to mounting bracket 100. Flashing 120 may be tucked under the down-roof facing portion of tile 201A, over up-roof facing portion of tile 201B, and under the right edge of the tile to the left of opening 202 and over the lip of left edge of the tile to the right opening of opening 202 so that opening 202 is completely covered by flashing 120. Then, up-roof tile 201A is allowed to slide back down-roof until it partially covers flashing 120 and rests against mounting bracket 100, thereby providing a completed weatherproof attachment assembly for attaching additional PV module mounting hardware.

In various embodiments, the next step will be to attach an adapter such as adapter 130 to flange 104 of mounting bracket 100 by inserting bolt 131 through adapter 130 and flange opening 105 and securing bolt 131 with a nut. Then, in various embodiments, top arm 140 with integrated PV module connector 141 is secured to adapter 140 using threaded bolt 144 that fits through a slot in the top-facing surface of arm 140 and engages threads inside an opening in the top of adapter 130 to secure top arm 140 and connector 141 at the desired location relative to adapter 130. At this point, photovoltaic panel 300 can be secured to connector 141 via its frame, thereby holding panel 300 in a suspended plane above tile roof 200.

Alternatively, in various other embodiments, the next step after allowing tile 201A to slide back down-roof to rest against mounting bracket 100 will be to attach a section of cantilever rail 160 to flange 104 of the mounting bracket by inserting a T-bolt into a lower channel 161 of cantilever rail 160 and passing the threaded end of the bolt through opening 105 in flange 104 before securing it with a nut. Rail 160 may be slid relative to mounting bracket 100 along the direction defined by the channel before the nut tightened down. Next, one or more rail brackets 150 with integrated connector 153 are attached to either upper channel 162A, 162B at the desired location using T-bolt 151 and corresponding nut 152 to hold rail bracket 150 and connector 153 at the desired location with respect to mounting bracket 100. A PV module may then be attached to connector 153 as depicted in FIG. 9 to create a PV array.

As discussed above, it should be appreciated that although panel 300 of FIG. 9 is depicted as having a grooved frame, various embodiments of the invention may be adapted to work with panels that do not have grooved frames by replacing connectors 141,153 with clamping frame connectors, gripping connectors or other suitable connectors. Such modifications are within the spirit and scope of the invention.

Figure 11:
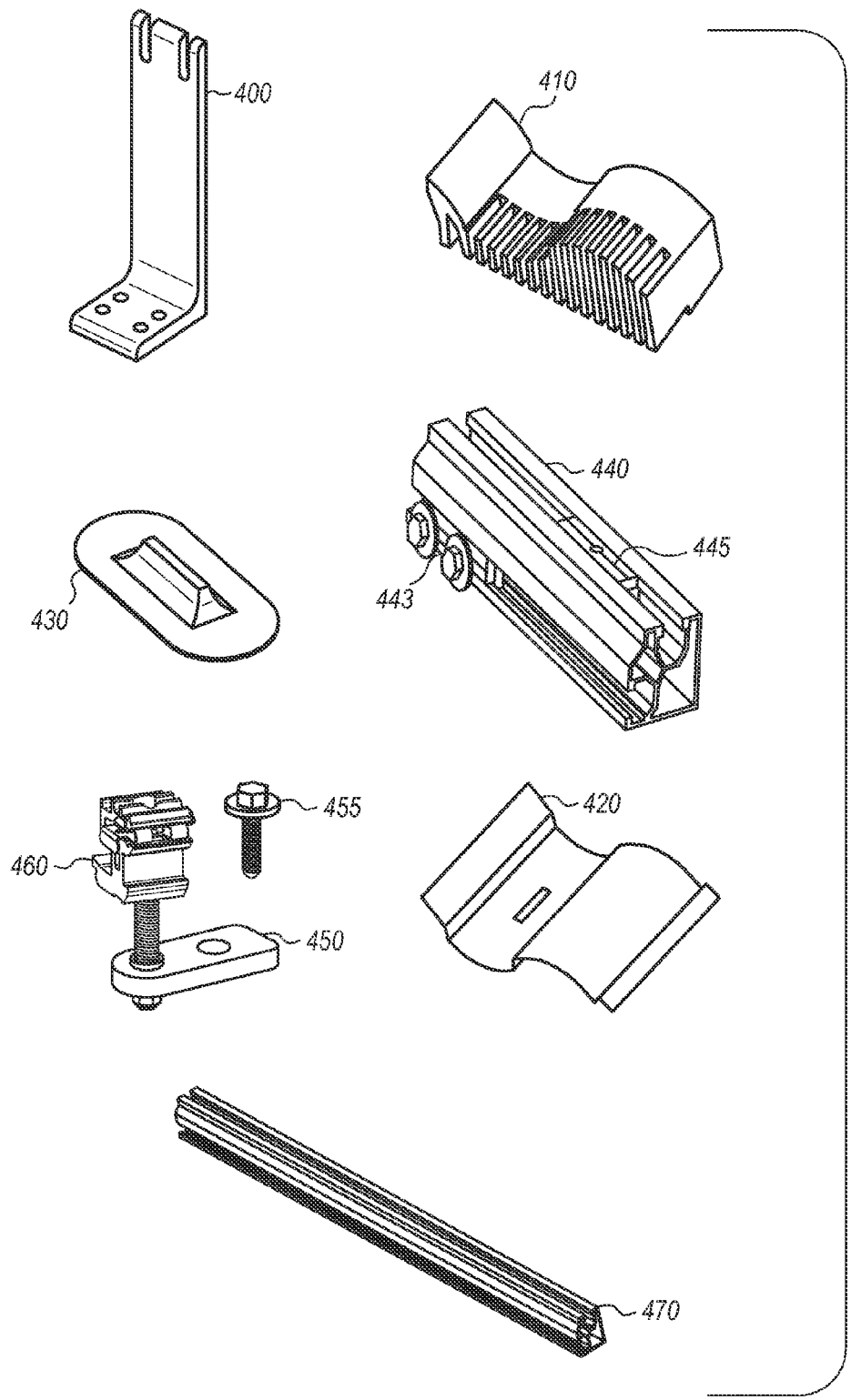
FIG. 11 illustrates components of a photovoltaic mounting system according to another exemplary embodiment of the invention.

Referring now to FIGS. 11-21, these figures illustrate a PV mounting system for tile roofs according to other embodiments of the invention. Turning to FIG. 11, this Figure shows components of an alternative mounting system to that depicted in FIG. 1. The system includes mounting bracket 400, flashing support member 410, flashing portion 420, flashing boot 430, and top arm 440. Top arm 440 includes top arm mounting bracket 443 and sliding channel mount 445. The system also includes foot 450 with PV module connector 460 and foot lag screw 455 that engages with sliding channel mount 445. The system, may also include cantilever rail 470 for applications where cantilevering is required. In such applications, the cantilever rail 470 may be used in place of top arm 440.

Figure 12:
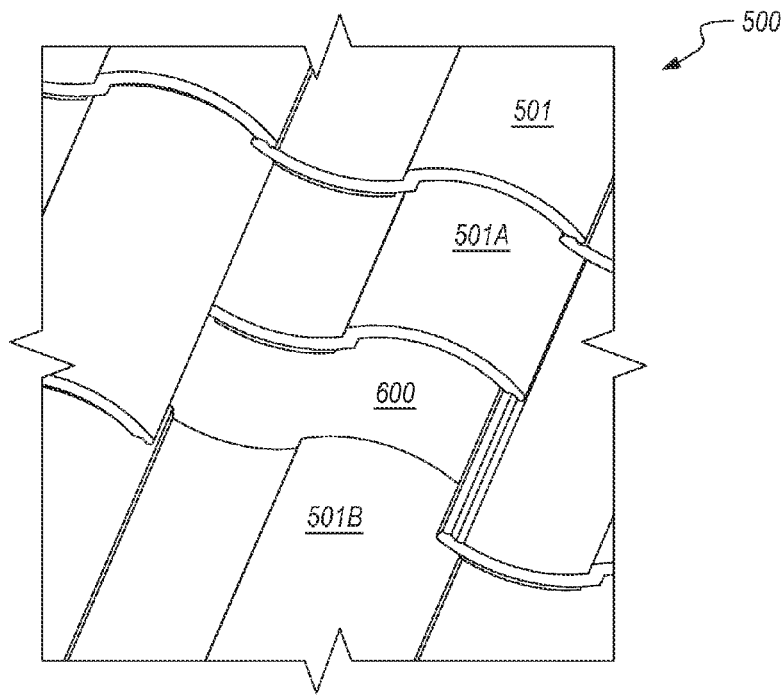
FIGS. 12 and 13 are perspective views of a section of roof illustrating two steps of a method of installing the photovoltaic mounting system according to the exemplary embodiment shown in FIG. 11 on a curved tile roof.

FIG. 12, depicts tiled roof 500 that includes tiles 501 installed over roof deck 600. The tiles may be clay tiles, ceramic tiles, cement tiles, or tiles made of other rigid material. In various embodiments, one tile, such as tile 501A, will be slid upwards under the tile above it to reveal roof deck 600 for purposes of attaching PV mounting hardware. In other embodiments, tile 501A may be completely removed, leaving a gap up-roof from tile 501B. Also, although tiles 500 of FIG. 12 are S-type tiles, it should be appreciated that the various systems and methods disclosed herein would work with tiles having a different profile, or even flat tiles.

Figure 13:
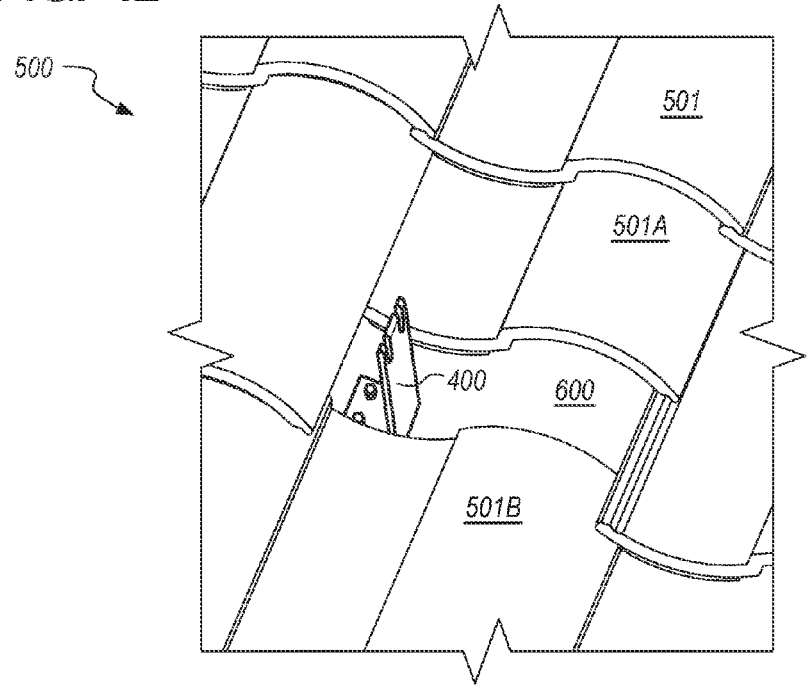

FIG. 13, shows the next step in utilizing the PV mounting system according to various embodiments of the invention. In FIG. 13, mounting bracket 400 has been attached to roof deck 600. In a preferred embodiment, mounting bracket 400 is attached at a point that allows its attaching lag screws to penetrate into a roof rafter and not just into roof deck 600 to provide greater stability to the system and to resistance to high winds. As shown in FIG. 13, in various embodiments, mounting bracket 400 points up, normal to the roof surface, so that a PV array supported by mounting bracket 400 will be in a parallel plane to and at substantially the same slope as roof deck 600. Also, although mounting bracket 400 is shown with a pair of recesses for receiving two mounting screws, it should be appreciated that the mounting bracket may have a single recess, one or more holes, or other feature(s) for facilitating attachment of subsequent components. For example, mounting bracket 100 shown in FIGS. 3A and 3B has only single hole 105 and pair of notches 106A and 106B. In various embodiments, it may be desirable that mounting bracket 400 be mounted at a point on roof deck 600 that is directly up-roof from the low portion of down-roof tile 501B (e.g, in the valley, not in the peak) as shown in FIG. 13.

Figure 14:
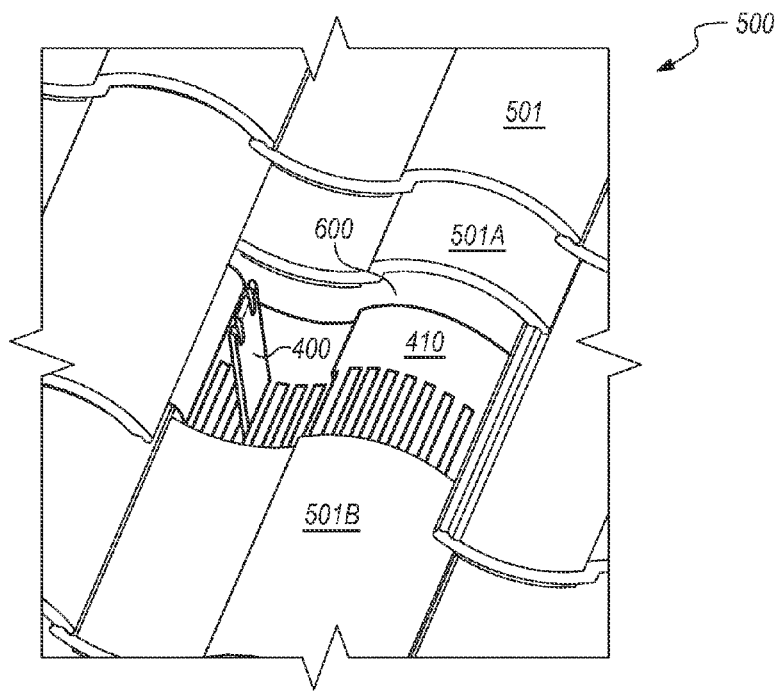
FIGS. 14 and 15 are perspective views of a section of curved tile roof including a flashing support member and flashing member respectively for the photovoltaic mounting system according to the exemplary embodiment shown in FIG. 11.

Referring now to FIG. 14, in this Figure flashing support 410 has been placed on roof deck 600. Unlike flashing support 110 depicted in FIGS. 1 and 4, flashing support 410 has a series of vertical slits precut all the way through on the down-roof side of flashing support 410, like a comb, to enable mounting bracket 400 to pass through at numerous different locations along the East-West direction, without the need to tear or alter flashing support 410. In various embodiments, flashing support 410 will be pre-formed with a curvature that mimics the curvature of the tiles (e.g., S-curve, wave tile, square tile, etc.). In various other embodiments, flashing support 410 will simply conform to the shape of the flashing and/or tile once it is loaded with weight, such as the weight of tile 501A.

Figure 15:
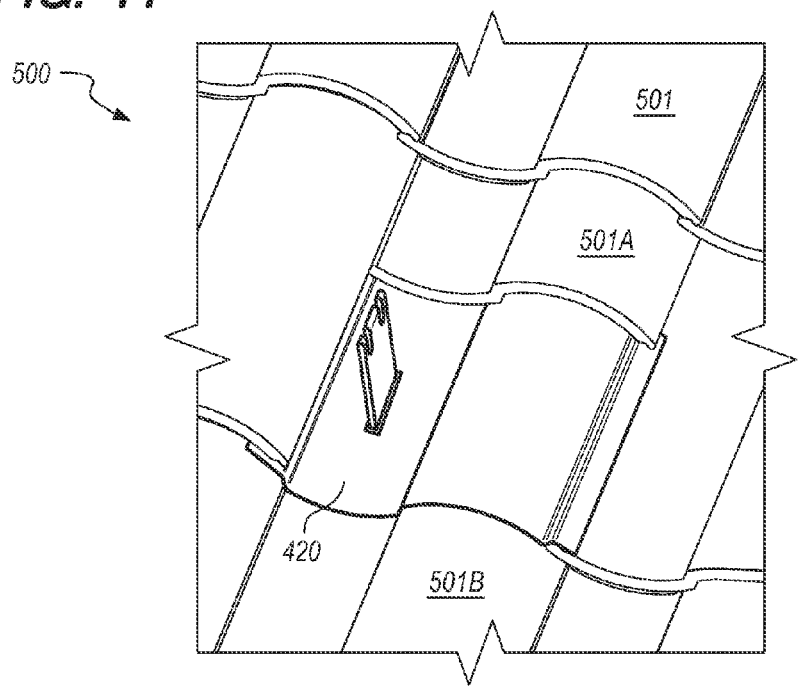

FIG. 15, illustrates tile array 500 after flashing 420 has been installed over flashing support 410. In various embodiments, flashing 420 may be made out of a malleable metal such as tin. In various other embodiments, flashing 420 may be rigid and pre-formed to mimic the curvature of the surrounding tiles 501. In still further embodiments, flashing 420 may be formed of a rubberized material that is either pre-formed or conforms to the curvature of the surrounding tiles 501. In the exemplary embodiment shown in FIGS. 11 and 15, flashing 420 is per-formed with an opening that is dimensioned to allow it to be installed unimpeded over mounting bracket 400 so that mounting bracket 400 protrudes through the opening and flashing 420 is allowed to slide down mounting bracket 400 until rests on flashing support 410. In various embodiments, flashing 420 may have enough material on either side to compensate for different locations of the mounting bracket 400 with respect to roof deck 600 in the East-West direction. Extra material may simply be compressed to fit within opening to roof deck 600 or may be cut with a razor knife or other tool.

Figure 16:
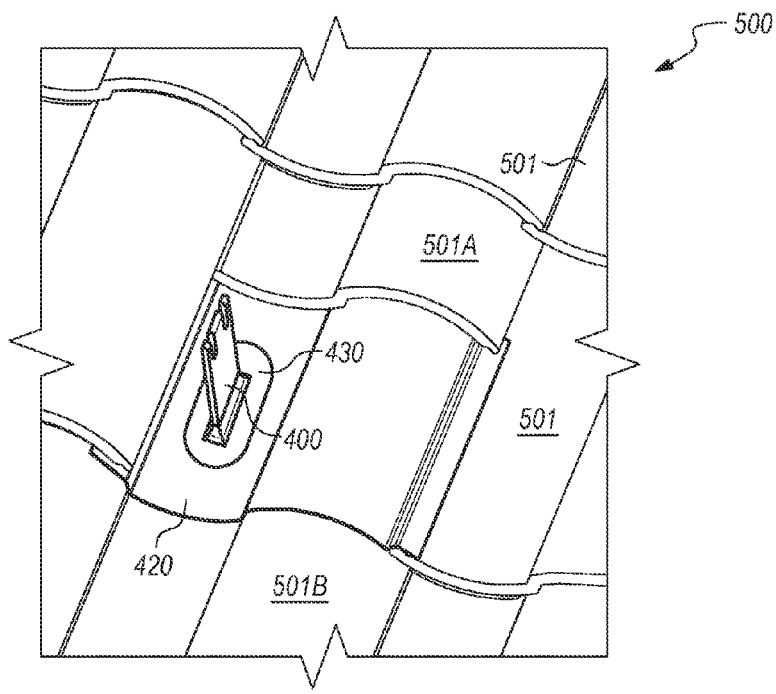
FIGS. 16 and 17 are perspective views of a section of curved tile roof including a flashing boot for the photovoltaic mounting system according to the exemplary embodiment shown in FIG. 11.

In FIG. 16, the next step of the installation process for the PV mounting system of FIG. 11 has been completed. Specifically, flashing boot 430 has been slid over the distal end of mounting bracket 400 until it contacts the upward facing surface of flashing 420, thereby creating a weatherproof seal to prevent the ingress of water into the space above roof deck 600. In various embodiments, flashing boot 430 will include a rubberized or otherwise semi-flexible material formed around a slit that is dimensioned to fit over mounting bracket 400 when stretched, but rigid enough to create a seal around it. Moreover, flashing boot 430 may include an adhesive material on the underside to further seal it to flashing 420 and cover up the hole formed in that component. Alternatively, adhesive may be applied on flashing 420 around the opening, or to the underside of flashing boot 430, or both, to facilitate a weatherproof seal between these components.

As depicted in FIGS. 11 and 16, flashing boot 430 may include an upward-tapered base that supports the opening so that after boot 430 is installed over mounting bracket 400, all surfaces will tend to divert water away from boot 430, thereby preventing pooling of water, which could enhance or speed-up the degradation of boot 430 over time and potentially allow water to reach the roof.

Figure 17:
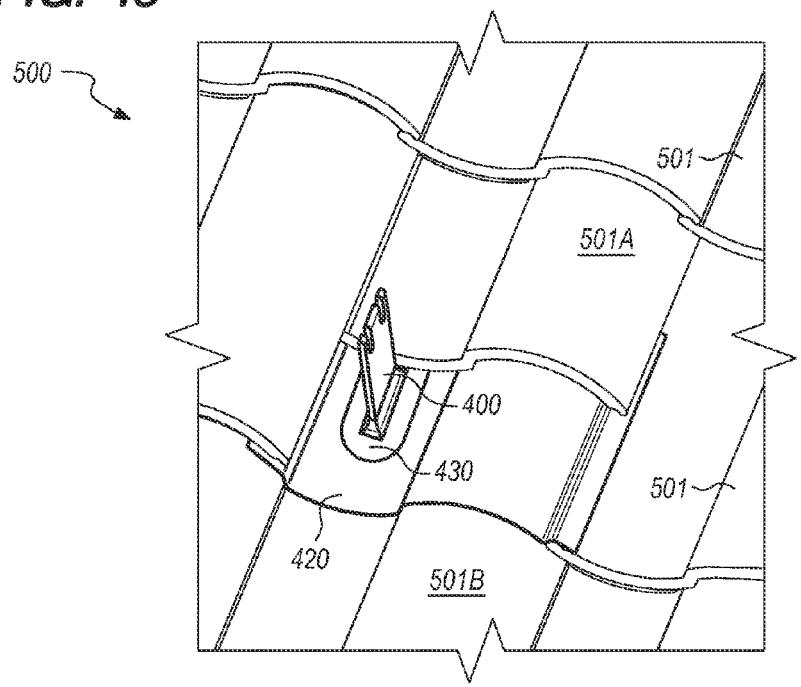

In FIG. 17, up-roof tile 501A is allowed to return to its normal position until it comes to rest against mounting bracket 400. It should be appreciated that in embodiments where flashing 420 covers the entire opening created by the removal of tile 501A, up-roof tile 501A will simply be removed. In such embodiments, flashing 420 will be dimensioned large enough to permit it to slide partially under the next up-roof tile in the array 500 while still completely covering the opening created by removing tile 501A, thereby preventing the ingress of water to roof deck 600.

Figure 18:
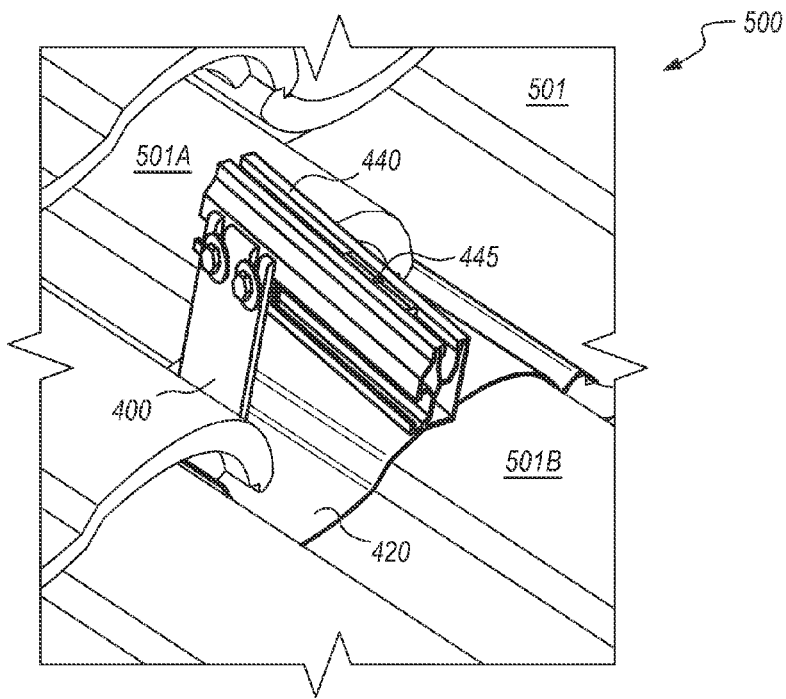
FIGS. 18 and 19 are perspective views of a section of curved tile roof including a top rail and photovoltaic module coupling device respectively for the photovoltaic mounting system according to the exemplary embodiment shown in FIG. 11.
Figure 19:
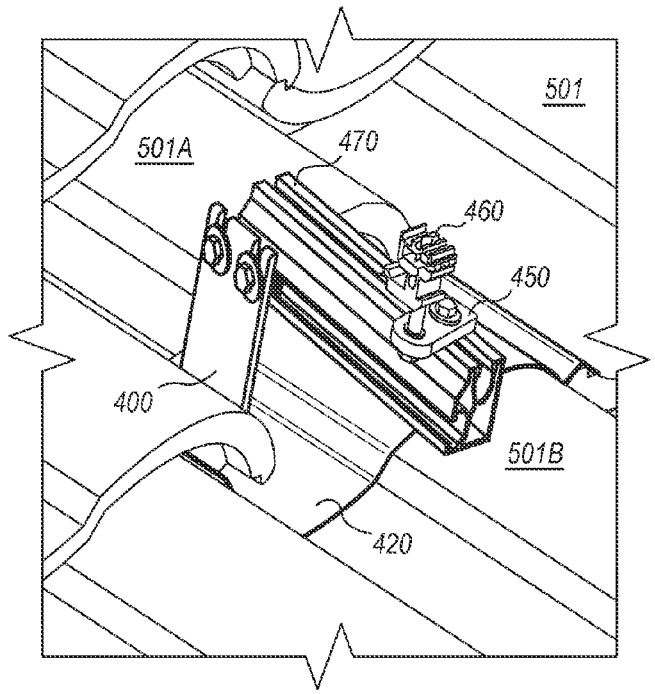

Referring now to FIG. 18, this Figure shows the next step in installing the PV mounting system according to various embodiments of the invention. In this Figure, top arm 440 has been attached to mounting bracket 400 via reciprocal top arm mounting bracket 443. In this example, two bolts engage two openings formed in the top of mounting bracket 400, although it should be appreciated that other means of interconnection are possible without departing from the spirit or scope of the invention. For example, FIGS. 1, 7, 8A, and 8B show an alternative upper arm 140 and mechanism for attachment to mounting bracket 100. Such variations will appreciated by those of ordinary skill in the art to be within the scope of the invention.

Reciprocal mounting bracket 443 allows top arm 440 to be moved up or down the roof, in the North-South direction, as necessary to provide the required support for one or more photovoltaic panels making up the PV array. It should be appreciated that instead of top-arm 440, section of cantilever rail 470 may be attached to mounting bracket 440 using the same type of reciprocal mounting bracket. This may be particularly useful in the first row of an array (lowest on the roof) or top-most row so that the array can be cantilevered over a section of the roof where a mounting bracket could not be attached, such as, for example, at the eave or at the ridge where the tiles are often attached with mortar. Ultimately, this may allow a larger array to be installed on the tile roof.

Top arm 440 may also include sliding channel mount 445 that receives a threaded end of leveling foot support screw 455 used to attach a leveling foot such as foot 450 to the top arm 440. Alternatively, a T-bolt may be used in channel 470 formed in the top of arm 440. Leveling foot 440 may terminate in a rock-it type connector such as rock-it 460 shown in FIG. 19. In various embodiments, connector 460 may be used to attach one PV module, a pair of PV modules, and/or a PV module and a section of array skirt. In various embodiments, connector 460 may have a rotatable member that is accessible from above, (i.e., looking down) even after a PV module has been attached to connector 460 so that the height of the module with respect to the roof may be adjusted. In various embodiments, rotation of this rotatable member will cause connector 460 to raise or lower with respect to the top arm 440, thereby raising and/or lowering the PV module with respect to the roof deck.

Figure 20:
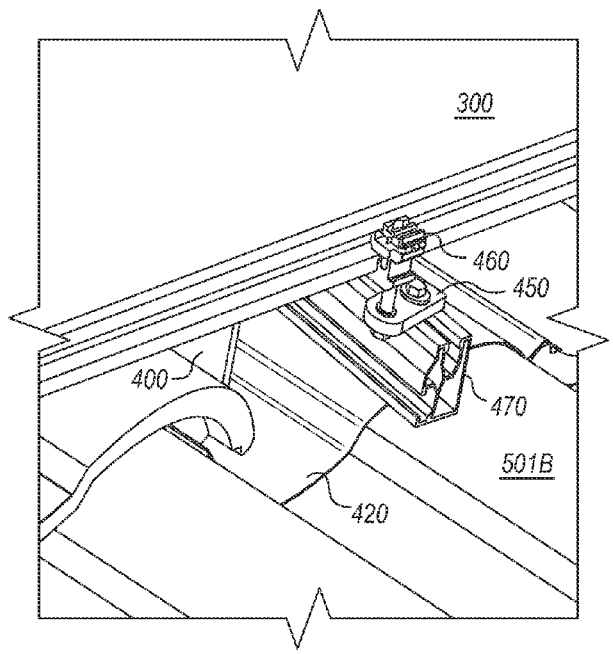
FIG. 20 is a perspective view of a section of curved tile roof including a photovoltaic module mounted using a photovoltaic mounting system according to an exemplary embodiment of the invention.
Figure 21:
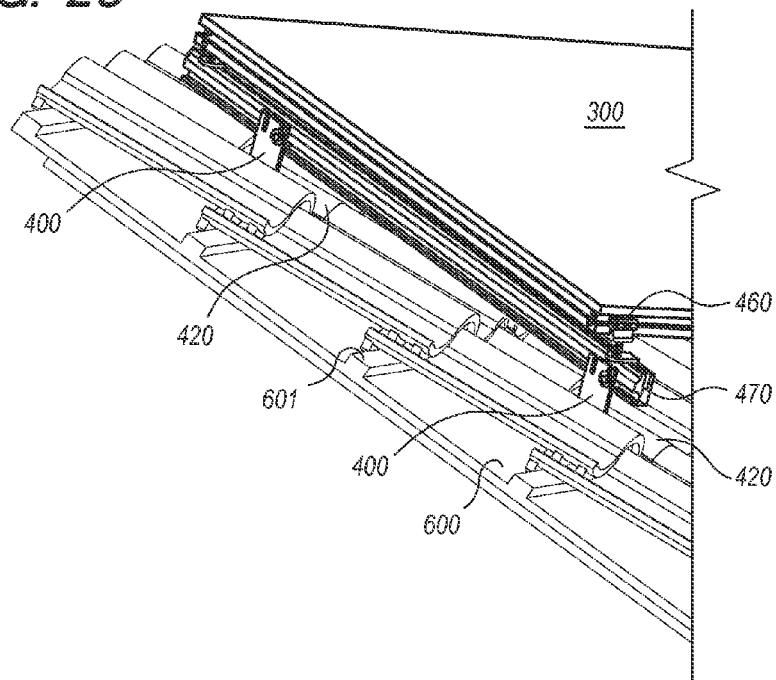
FIG. 21 is a perspective view of a section of curved tile roof including a photovoltaic module mounted using a photovoltaic mounting system according to another exemplary embodiment of the invention.

FIG. 20 shows connector 460 attached to a groove of PV module 300. It should be appreciated that various embodiments of the invention may be usable with non-grooved modules by employing a different type of connector than connector 460. For example, a clamping connector may be used to hold the module frame. Such variations are within the spirit and scope of the invention. In FIG. 20, connector 460 is supported by a section of cantilever rail 470. FIG. 21 is another perspective view of PV module 300 attached to roof deck 600 via a tile mounting system according to various embodiments of the invention.

Figure 22:
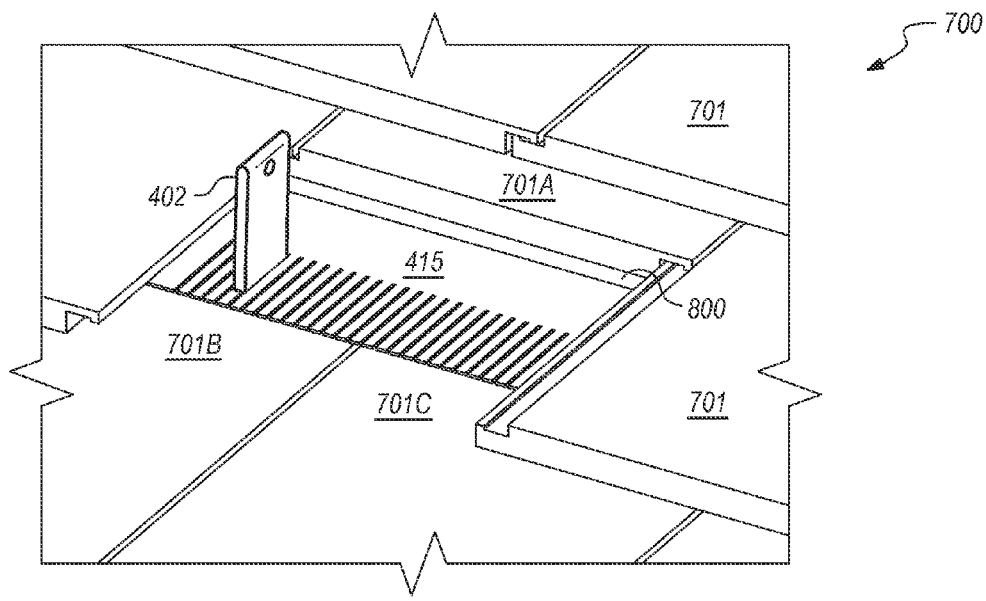
FIGS. 22, 23, and 24 are perspective views of a section of flat tile roof including components of a photovoltaic mounting system according to various embodiments of the invention.

FIG. 22 illustrates an embodiment of the invention particularly adapted for use with flat roof tiles. In the system shown FIGS. 22-24, tile 701A is pushed upward under the tiles in the up-roof row to reveal roof deck 800. Mounting bracket 402 is attached to roof deck 800 and flashing support 415 is pushed down over the mounting bracket 402 until it rests on the roof deck. As seen in FIG. 22, in this embodiment, the flashing support 415 may be flat to mimic the flat shape of the roof, but still includes a plurality of slits to accommodate different positions of mounting bracket 402 from left to right of roof deck 600.

Figure 23:
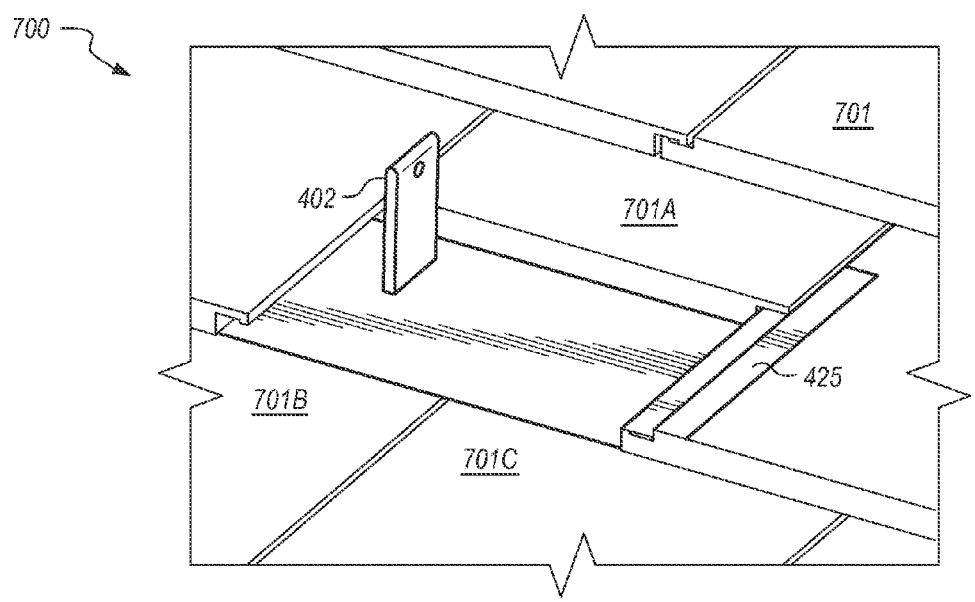
Figure 24:
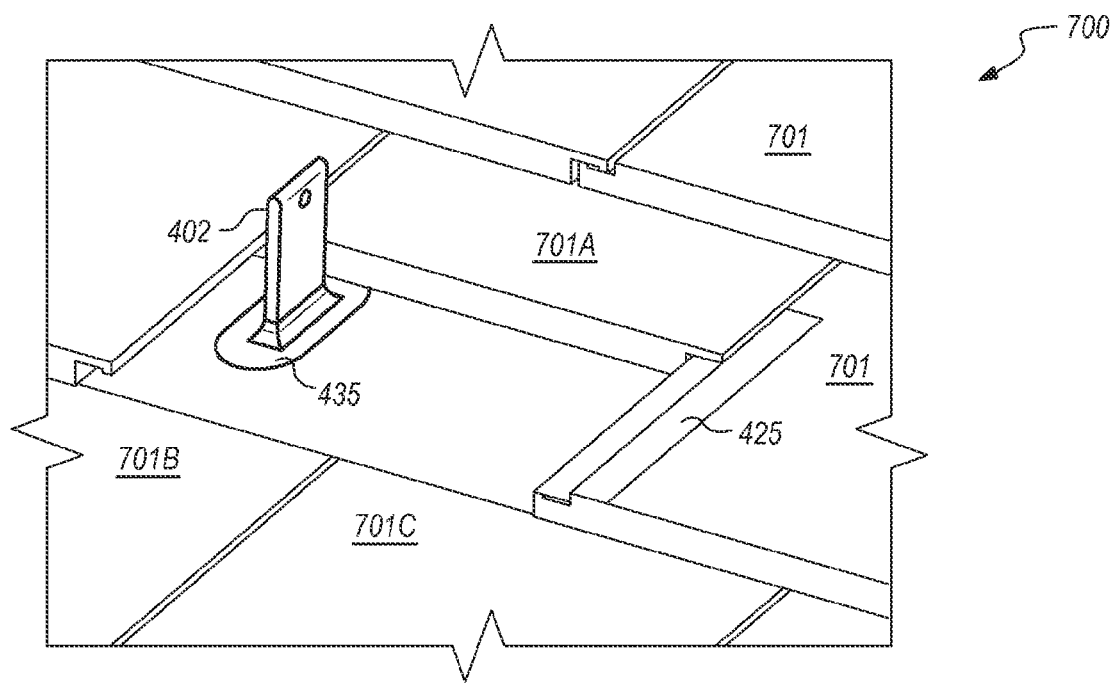

In FIG. 23, flashing 425 is installed over flashing support 415. Flashing 425 shown in FIG. 23 is substantially flat but includes reciprocal tongue-and-groove shapes on either end to match ends of the tiles on either side in the East-West directions. In FIG. 24, flashing boot 435 is shown installed over the distal end of mounting bracket 402, resting on top of flashing 425 thereby creating a weatherproof seal to prevent the ingress of water into the space above roof deck 600. As with flashing boot 430 in FIG. 16, in various embodiments, flashing boot 435 will include a rubberized or otherwise semi-flexible material formed around a slit that is dimensioned to fit over mounting bracket 400 when stretched but rigid enough to create a seal around it. Moreover, flashing boot 435 may include an adhesive material on the underside to further seal it to flashing 425 and cover up the hole formed in that component. Alternatively, adhesive may be applied on flashing 425 around mounting bracket 402, or to the underside of flashing boot 435, or both, to facilitate a weatherproof seal between these components.

As depicted in FIG. 24, flashing boot 435 may preferable include an upward-tapered base that supports the opening so that after boot 435 is installed over mounting bracket 402, all surfaces will tend to divert water away from boot 435, thereby preventing pooling, which could enhance or speed-up the degradation of boot 435 over time.

Referring now to FIGS. 25-30, these Figures depict a system for mounting photovoltaic panels on a tile roof according to yet another exemplary embodiment of the invention. Although the system shown in FIGS. 25-30 shares various features and benefits of the systems shown in the other preceding Figures, it differs in that the mounting bracket depicted in those preceding embodiments has been replaced with a tile hook.

Figure 25:
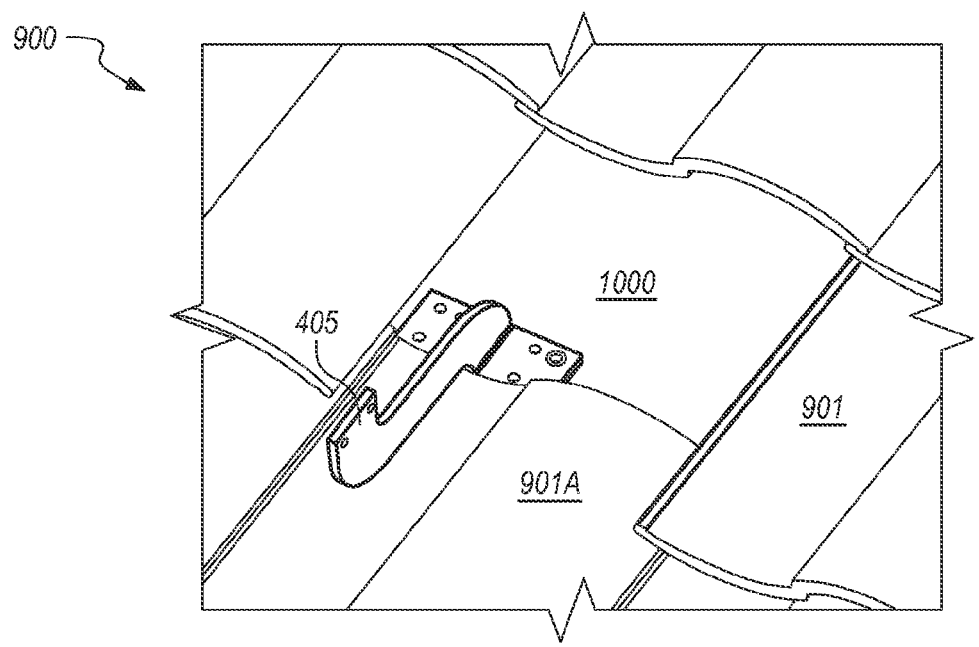
FIG. 25 is a perspective view of a section of curved tile roof including a tile hook for a photovoltaic mounting system according to various embodiments of the invention.

FIG. 25 depicts tile array 900 installed over roof deck 1000. Tile array 900 of FIG. 25 is comprised of wave-shaped tiles (a softer curve than s-shaped tile). In FIG. 25, the tile located at the desired location of hook 405 has been removed. In various embodiments, the tile may instead be slid upwards under the next up-roof row of tiles as in other embodiments. As shown, hook 405 comprises an S-hook with a plurality of holes in the base for attaching it to roof deck 1000. Preferably, it is attached at location that permits the lag screws holding the hook base to the roof to penetrate a roof rafter under roof deck 1000. Also, as shown in FIGS. 25-30, hook 405 may include a pair of holes at the distal end for attaching additional PV mounting components. It should appreciated that the hook may include a different shape at the distal end for attaching additional components, such as the various mounting brackets 400, 402 illustrated in the prior figures.

Figure 26:
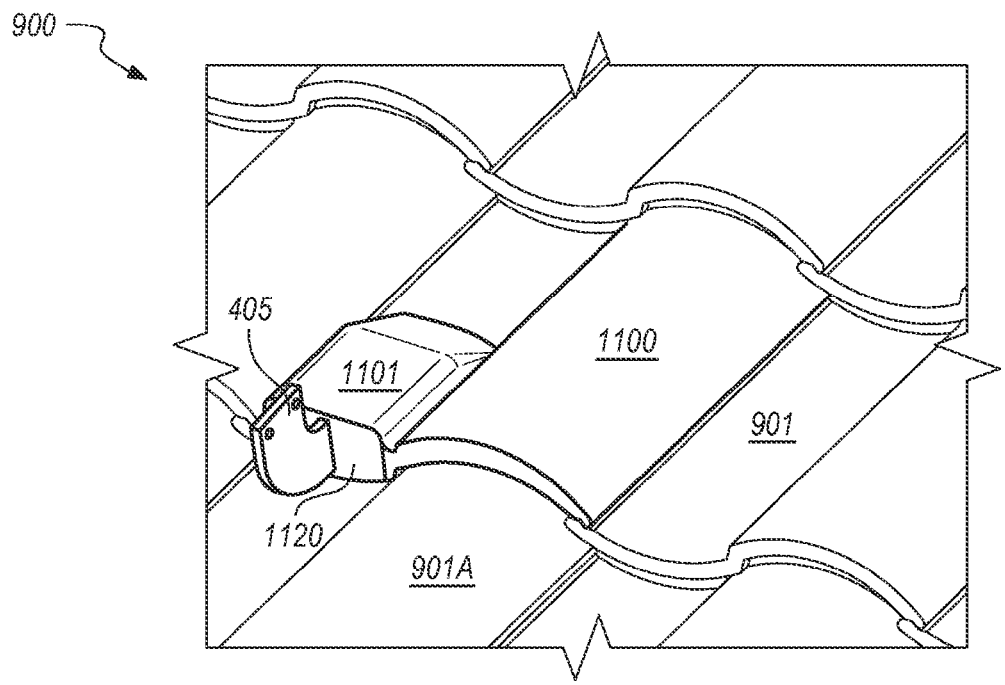
FIG. 26 is a perspective view of a section of curved tile roof including photovoltaic mounting system with a full replacement tile flashing according to various embodiments of the invention.

Turning now to FIG. 26, this Figure illustrates flashing 1100 adapted to work with tile hook 405. Unlike, the flashing shown in previous embodiments, flashing 1100 is more rigid and therefore does not require a flashing support to maintain its shape or provide structural support. In various embodiments, flashing 1100 is essentially a replacement tile or a partial replacement tile. In various embodiments, flashing 1100 may be curved to mimic the curve of surrounding tile array 900, however, flashing 1100 may take on other shapes for use with other tile types. Flashing 1100 may include raised opening 1101 that is adapted to fit over tile hook 405 when flashing 1100 is secured within the tile array. In various embodiments, flashing 1100 may include a ridge on one side and a channel on the other for mating with adjacent tiles on either side of flashing 1100 in the East-West direction.

FIG. 26 also illustrates plug 1120 made of foam or other suitable material for closing the opening in flashing 1100 where hook 405 protrudes. In some embodiments, plug 1120 may have a series of vertical slits that are adapted to fit over hook 405 when it is installed in the opening. Plug 1120 may also fit under flashing 1100 and contact roof deck 1000 to make plug 1120 more resistant to falling out of raised opening 1101. In other embodiments, an installer may simply cut a slit in plug 1120 at the location of hook 405 to allow plug 1120 to achieve a snug fit, thereby discouraging bugs, pests and debris from entering the opening. As depicted in both FIGS. 25 and 26, in various embodiments it may be desirable to locate tile hook 405 on the valley (e.g., lower) side of flashing 1100.

Figure 27:
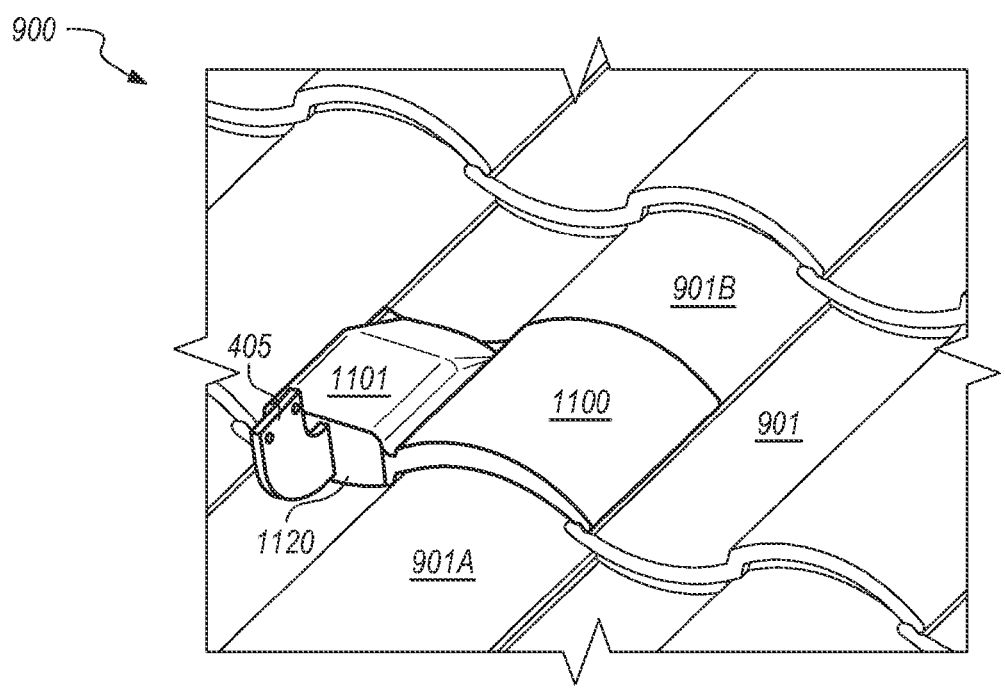
FIG. 27 is a perspective view of a section of curved tile roof including photovoltaic mounting system with a partial replacement tile flashing according to various embodiments of the invention.

FIG. 27 illustrates a substantially identical mounting system as shown in FIG. 26, but instead of a full replacement tile, flashing 1100 is only a partial replacement tile. As a result, instead of removing up-roof tile 901B, this tile has merely been slid up to allow installation of hook 405 and flashing 1100, before returning it to is normal position, resting against raised opening 1101 of flashing 1100.

Figure 28:
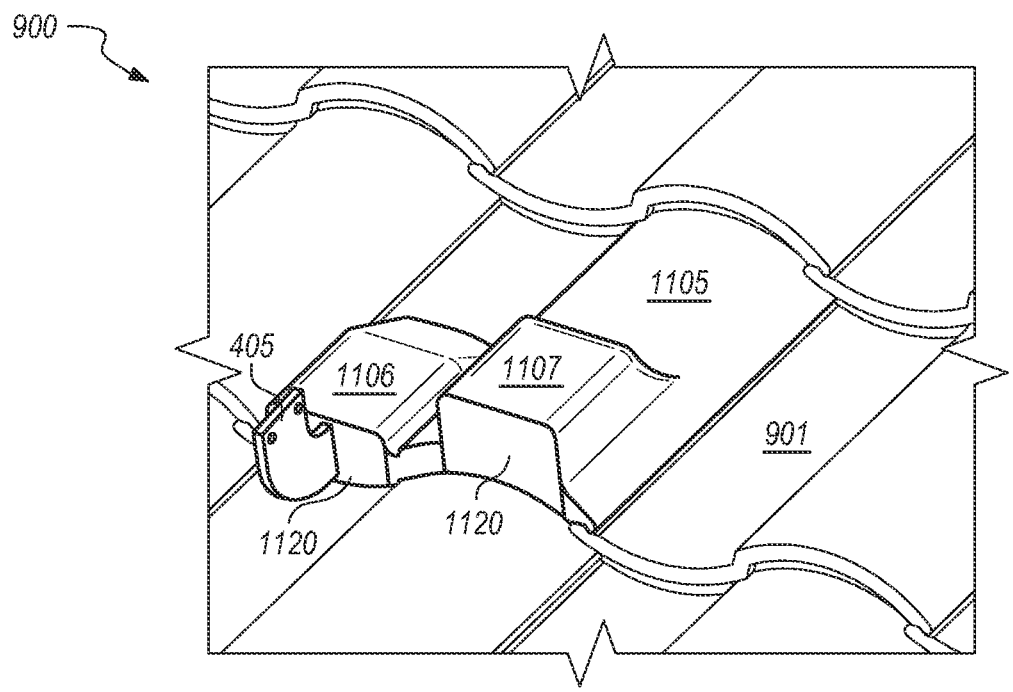
FIG. 28 is a perspective view of a section of curved tile roof including photovoltaic mounting system with a full replacement tile flashing according to other embodiments of the invention.

FIG. 28 shows alternative flashing 1105 that includes two openings 1106 and 1107 that enable tile hook 405 to be installed on either the valley or peak side of flashing 1105. In various embodiments, both openings will be closed with plugs 1120, or optionally a one-piece plug having two portions will be used. Flashing 1105 may provide greater flexibility in locating the position of S-hook 405 with respect to the underlying roof rafters on either the peak or valley side of a curved tile. In some situations, it may not be possible to locate tile hook 405 on the valley side of flashing 1105 and still be able to engage the roof rafter with the mounting screws in the base of tile hook 405.

Figure 29:
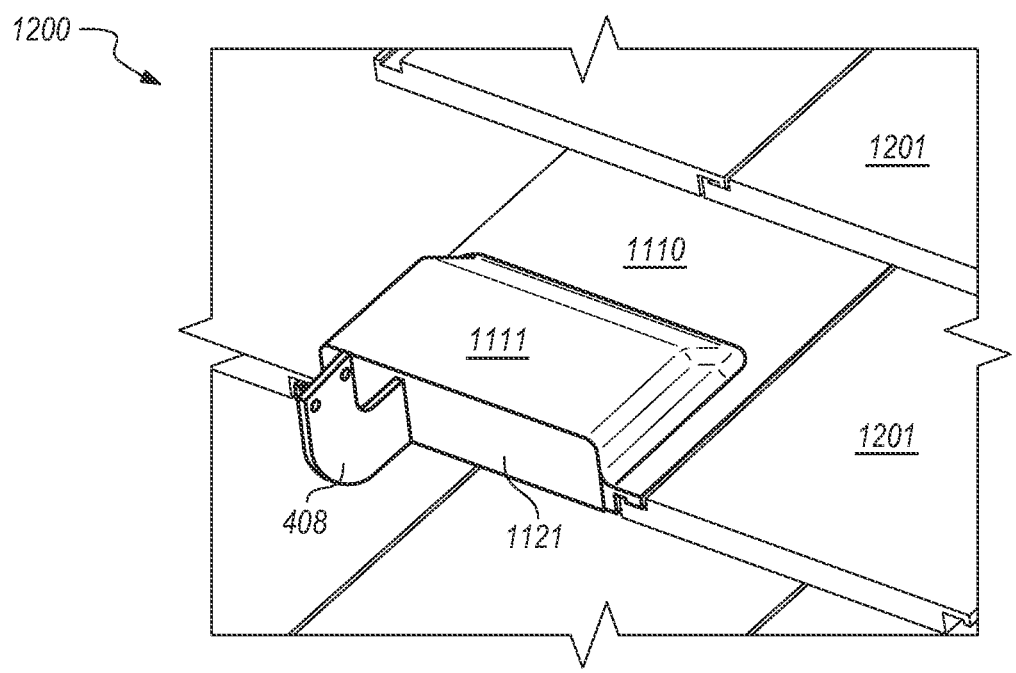
FIG. 29 is a perspective view of a section of flat tile roof including photovoltaic mounting system with a full replacement tile flashing according to other embodiments of the invention.

Turning now to FIG. 29, this Figure illustrates yet another embodiment of the invention depicted in preceding FIGS. 25-28, but in this embodiment, flashing 1110 is adapted to work with square tiles such as tile array 1200. In this example, flashing 1110 functions as a replacement tile. Unlike flashing 1100 or 1105 in FIGS. 27 and 28 respectively, flashing 1110 comprises single opening 1111 spanning substantially the entire width of flashing 1110 and therefore, nearly the entire width of the opening created by removing a tile. This provides maximum flexibility in the East-West direction for attaching the base of tile hook 405 to the roof deck. As seen in FIG. 29, because single opening 1111 spans substantially the entire width of flashing 1111, larger plug 1121 may be used so as to fill the entire opening and prevent ingress of bugs, rodents and debris.

Other than this dimensional difference, plug 1121 may be essentially identical in construction to plug 1120 shown in FIGS. 27 and 28. In a preferred embodiment, flashing 1110 may also include additional material in the up-roof direction to allow it to protrude under the row of up-roof tiles to prevent the ingress of water. Also, as shown in this Figure, flashing 1110 may include reciprocal edge joints to allow the tile to more precisely engage with the tiles on either side of the flashing in the East-West direction (across the roof from left to right).

Figure 30:
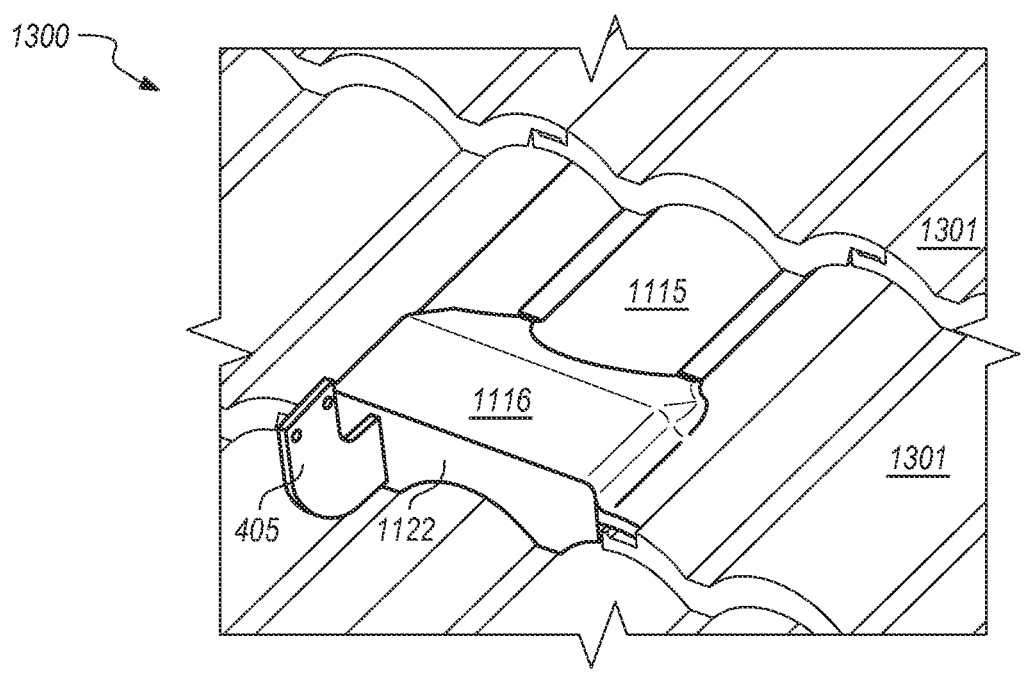
FIG. 30 is a perspective view of a section of wave tile roof including a photovoltaic mounting system with a full replacement tile flashing according to other embodiments of the invention.

FIG. 30 illustrates another tile replacement flashing 1115 according to various embodiments of the invention. Tile replacement flashing 1115 shown in this Figure is dimensioned to work with W-tile. Like flashing 1110 of FIG. 29, flashing 1115 includes single opening 1116 that spans substantially the full width of the flashing 1115 (e.g., one tile width). As shown in FIG. 30, the cross-sectional profile of flashing 1115 is preferably the same as the other tiles in array 1300 so as to allow the flashing to fit together with the adjacent tiles without compromising the array's integrity. Tile hook 405 protrudes through opening 1116 in the same manner as with other curved tiles, for example, preferable at a valley with respect to the closest down-roof tile. Although plug 1122 is shown as mimicking the curvature of the next down-roof tile, plug 1122 may simply comprise foam or other compressible material that can be compressed to substantially conform to the contour of the next-down-roof tile to ensure a snug fit.

Figure 31:
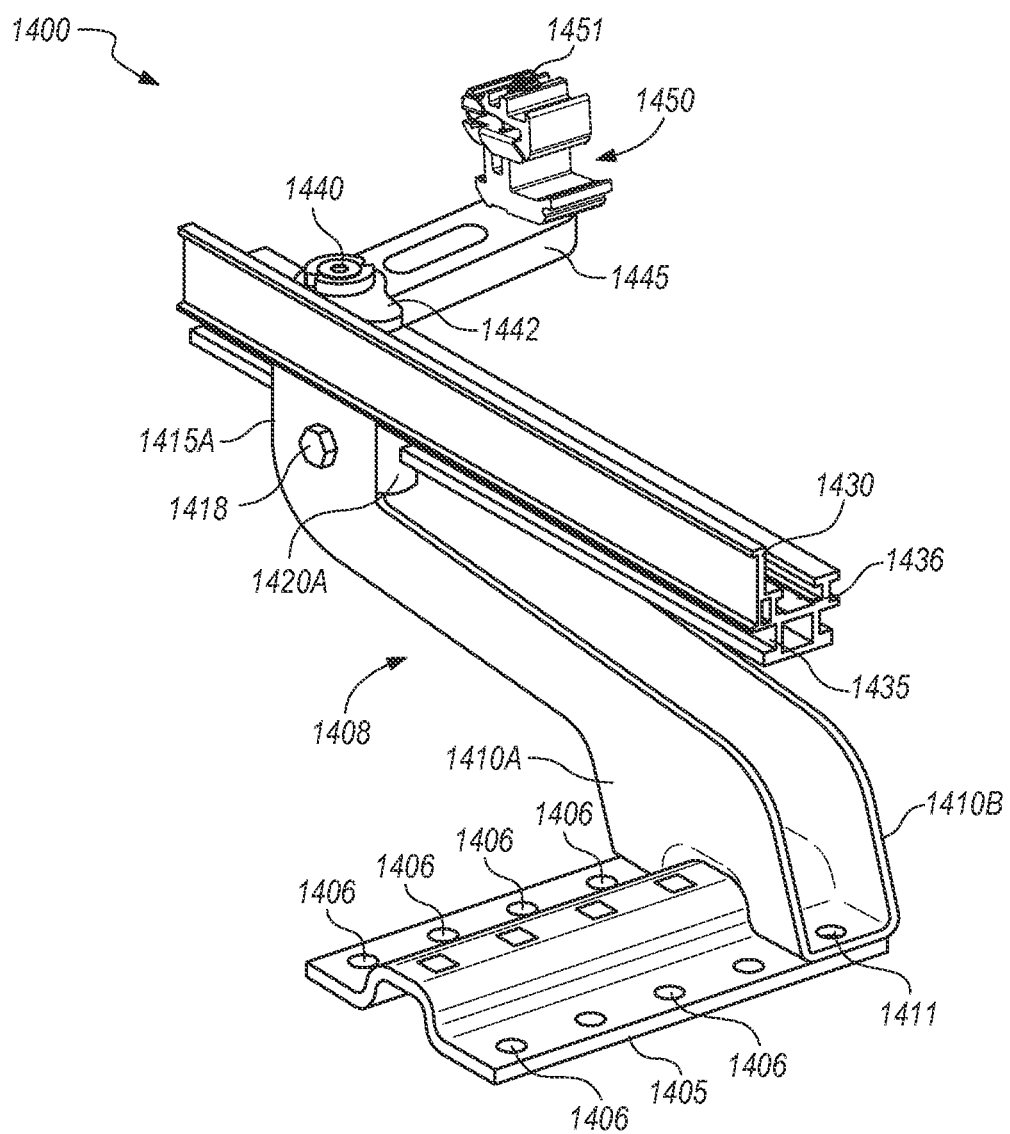
FIG. 31 is a perspective view of a photovoltaic mounting system for tile roofs according to another exemplary embodiment of the invention.
Figure 32:
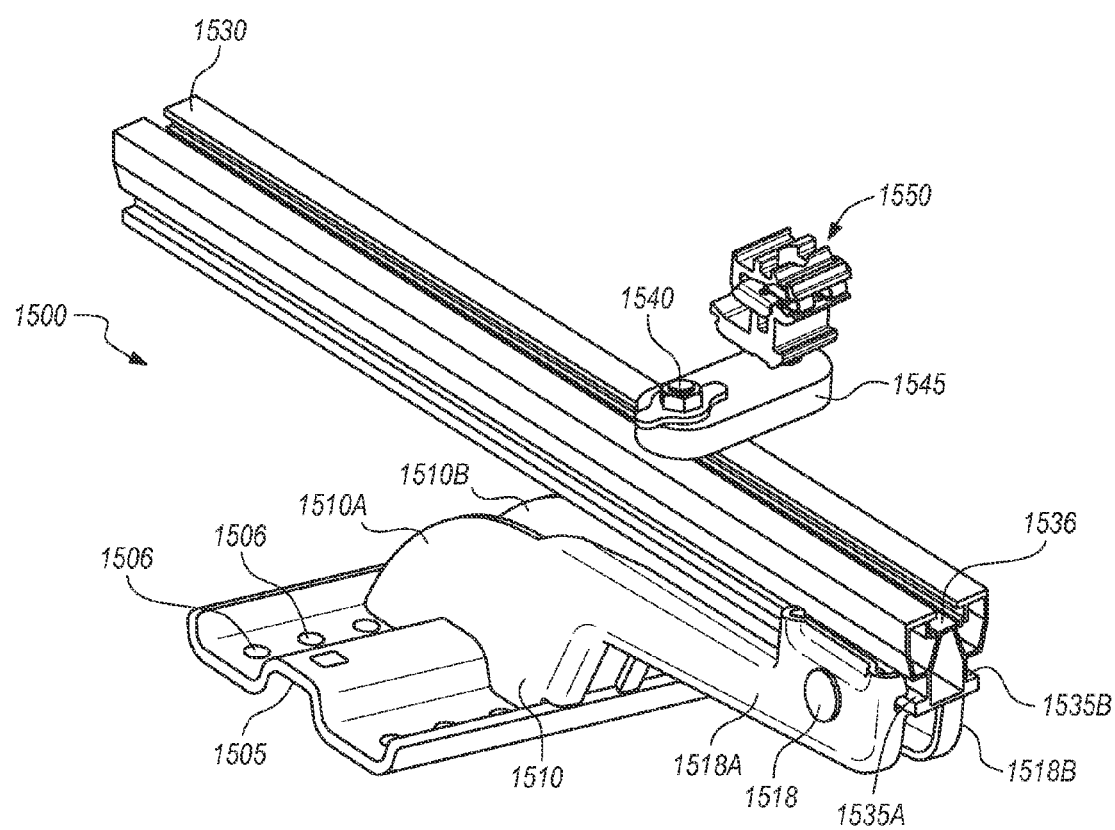
FIG. 32 is a perspective view of a photovoltaic mounting system for tile roofs according to another exemplary embodiment of the invention.
Figure 33:
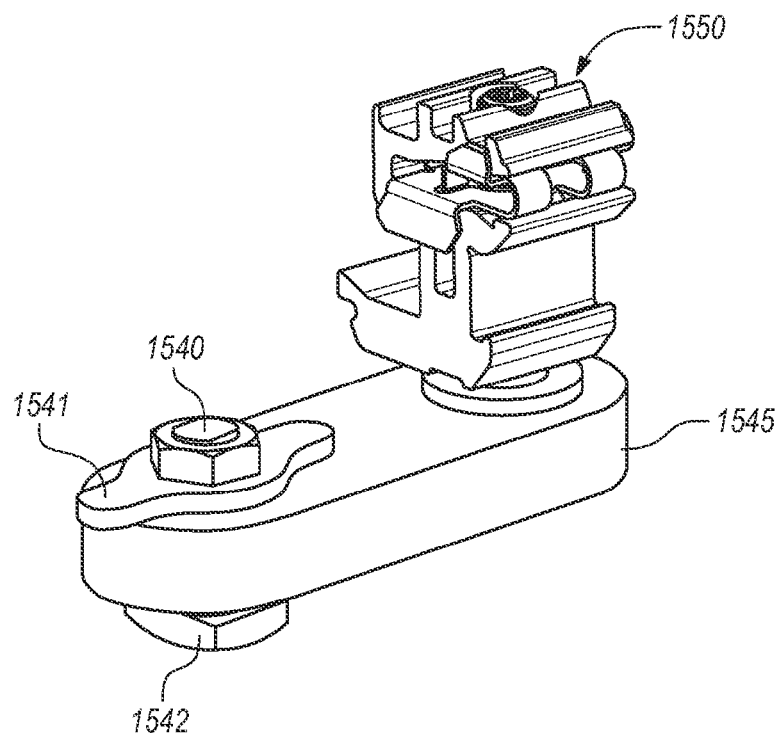
FIGS. 33 and 34 are perspective views of components of the exemplary photovoltaic mounting system of FIG. 32.
Figure 34:
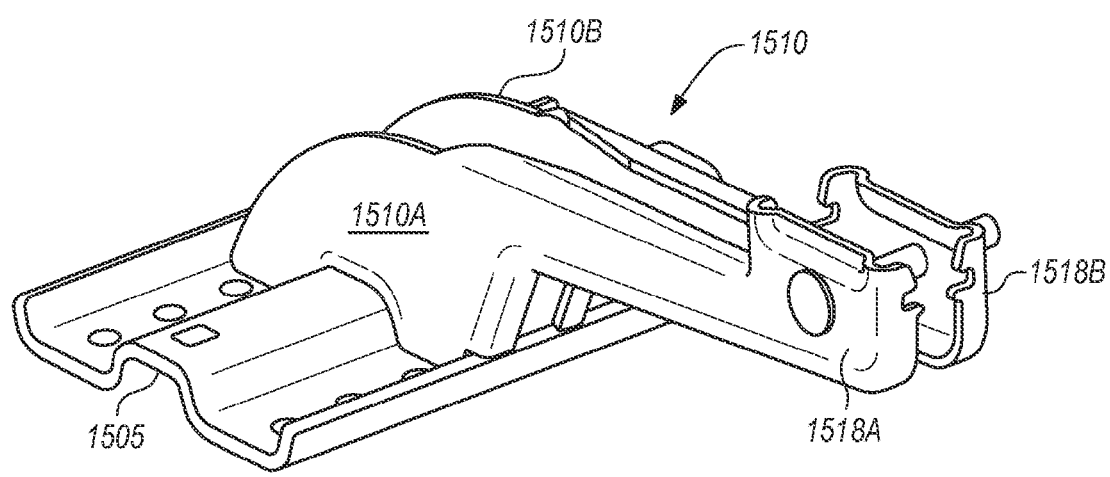
Figure 35:
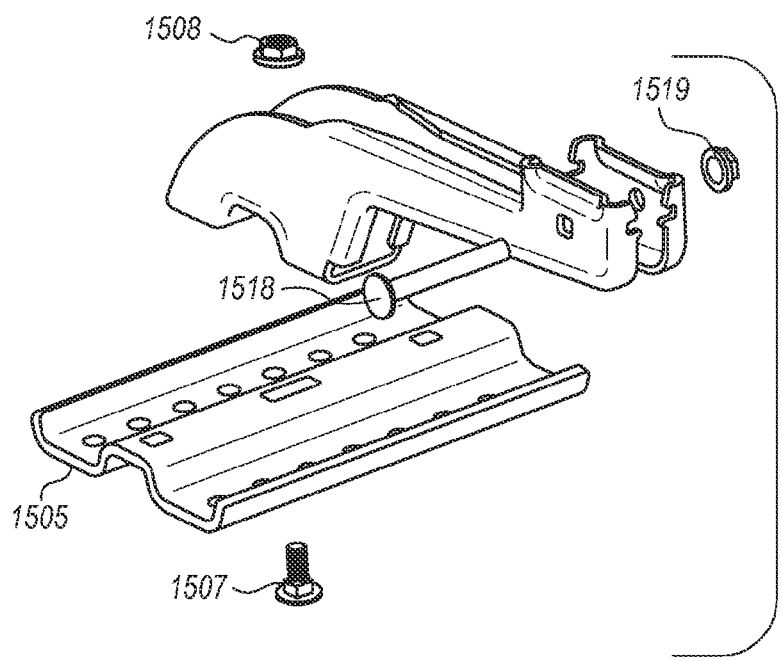
FIGS. 35 and 36 are exploded perspective views of portions of components of the exemplary photovoltaic mounting system of FIG. 32.

FIG. 31 illustrates PV mounting system 1400 according to another exemplary embodiment of the invention. System 1400 shown in FIG. 31 comprises base portion 1405 having two interconnected parallel rows of mounting holes 1406 for receiving a lag bolt, lag screw, hanger bolt, or other mechanical fastener that penetrates a roof deck surface, preferably although not necessarily, at a position over a roof rafter. System 1400 also comprises tile hook portion 1408. In various embodiments, and as depicted in FIG. 31, tile hook portion 1408 may comprise a pair of interconnected hook portions 1410A, 1410B, that span from base portion 1405 to distal ends 1415A, 1415B. Hook portions 1410A, 1410B may be joined into a single piece by a hook base that runs perpendicular to and between portions 1410A, 1410B. In various embodiments, the hook base may be shaped to fit over base portion 1405 and have two or more mounting holes 1411 adapted to fit over any two aligned mounting holes 1406 formed in base portion 1405. In this manner, hook portion 1408 and base portion 1405 may be attached to the roof deck and rafter with only a single pair of screws, lags, or other fasteners.

In various embodiments, the other end of the hook portion 1408, that is, the end opposite from the base, may comprise pair of tabs 1415A, 1415B that include ridges 1420A, 1420B respectively that define a groove for receiving a reciprocally-shaped flange formed in another mounting component. It should be appreciated that the specific shape of tabs 1415A, 1415B depicted in FIG. 31 is exemplary only. Various other connecting mechanisms may be used to connect the hook portion 1408 to other PV mounting components as illustrated in previous embodiments.

In system 1400, rail portion 1430 is connected to hook 1408 at tabs 1415A, 1415B. In various embodiments, flanges 1420A, 1420B engage with a groove formed on side faces of rail 1430. In various embodiments, bolt 1418 may pass through an opening in tab 1415A and through a reciprocal hole in tab 1415B, where nut 1419 engages threads on bolt 1418 to pinch rail portion 1430 between tabs 1415A, 1415B. In various embodiments, rail portion 1430 may slide from end to end between tabs 1415A, 1415B until nut 1419 at the end of bolt 1418 is fully tightened thereby allowing any connected PV mounting components to be moved closer to or further away from tabs 1415A, 1415B.

Next, in the exemplary embodiment shown in FIG. 31, top arm portion 1445 is attached to rail portion 1430 with rotating connector 1440. In various embodiments, the bottom portion of rotating connector 1440 contains a T-shaped male portion that fits into groove 1436 in the top of rail 1430 while handle portion 1442 is pointing towards the end of top arm 1445. In various embodiments, when handle portion 1442 is rotated in either the clock-wise or counter clockwise directions so that handle portion 1442 is aligned with the long axis of rail 1430 instead of top arm portion 1445, the T-shaped male portion fills in groove 1436, which is wider than the opening, and as a result can no longer be pulled out of groove 1436 until handle portion 1442 is rotated back in the direction of arm 1445 releasing the T-shaped male portion in groove 1436. This type of connector 1440 will allow arm 1445 to slide along the entire length of rail 1430 and then be locked into place at the desired location by manual rotation of handle portion 1442. In various embodiments, arm 1445 may come preloaded with connector 1440. In other embodiments, connector 1440 may be mated to arm 1445 at the time arm 1445 is attached to rail portion 1430, such as, for example, by a PV installer at or near the time of installation.

As shown in FIG. 31, a PV module connector, such as rock-it connector 1450, may be mounted on the other distal end of arm 1445 from connector 1440 to enable two photovoltaic modules to be connected. Rock-it connector 1450 may be attached to top arm 1445 with threaded screw 1451. In various embodiments, rotation of screw 1451 may cause connector 1450 to raise or lower with respect to top arm 1445, to enable height adjustment of a two-module array from above, even after the modules have been attached to connector 1450. In various embodiments, the head of screw 1451 may be shaped to receive a hex wrench, Torx wrench, Phillips screwdriver, flat screwdriver, or a standard or metric sized socket.

It should be appreciated that although FIG. 31 illustrates a rock-it connector for engaging with grooved frame PV module, the embodiment illustrated in FIG. 31 will also work with PV modules that have frames that are not grooved. In such embodiments, rock-it connector 1450 will be replaced with a different style connector such as a clamping connector, frame connector, or other suitable frame connector capable of detachably connecting the frames of one or more PV modules.

FIGS. 32-38 illustrate a photovoltaic mounting system for tile roofs according to another embodiment of the invention. System 1500 includes base portion 1505, which is similar to base portion 1405 of FIG. 31, with plurality of mounting holes 1506 that receive a lag bolt or other mechanical fastener to attach base portion 1505 to the roof deck. Unlike base portion 1405, base portion 1505 has a raised lip on both edges running the length of base portion 1505. This ledge provides additional subjacent support to hook portion 1510 when it is loaded.

Hook portion 1510 sits on a ridge formed in base portion 1505 and can be moved along the length of base portion 1505. In some embodiments, bolt 1507 may pass through base portion 1505 into the reciprocal base of hook portion 1510. Nut 1508 may be used to couple hook portion 1510 to base portion 1505 via bolt 1507. It should be appreciated that in other embodiments, hook portion 1510 and base portion 1505 may be formed as a single structure or may be welded together into a single structure. Further, having two rows of openings 1506 in hook portion 1505, provides an installer with more flexibility in securing base portion 1505 to a roof rafter regardless of the position of hook portion 1510 along base portion 1505.

As shown in the Figures, hook portion 1510 may include sides 1510A and 1510B that meet at base 1505 and run outward, terminating in respective flanges 1518A and 1518B. Flanges 1518A, 1518B may each include a recess that receives a portion of top rail 1530. In various embodiments, top rail 1530 may include left and right protrusions 1535A, 1535B which fit into the respective recesses formed in flanges 1518A, 1518B. Bolt 1518 and nut 1519 may compress flanges 1518A, 1518B against rail 1530 to hold it at the desired position. The greater the length of rail 1530, the greater the amount of cantilevering that can be performed with system 1500.

Once rail 1530 has been attached to hook 1510, arm portion 1545 can be attached at any point along rail 1530. In various embodiments, arm portion 1545 may include manual locking system 1540 comprising lever 1541 and cam 1542. Rail 1530 may include top-facing t-shaped channel 1536 running the entire length of rail 1530. Cam 1542 may be dimensioned so as to fit within channel 1536 when aligned with channel 1536 but to lock within channel 1536 when rotated approximately 90 degrees. In various embodiments, rotation may occur by rotating lever 1541, either manually, or with a suitable rotation tool. In this way, arm 1545 may be mated with rail 1530 at any point along rail 1530 and also selectively engaged and disengaged from rail 1530 with very little effort, while still providing a rapid and secure connection between these components.

Figure 36:
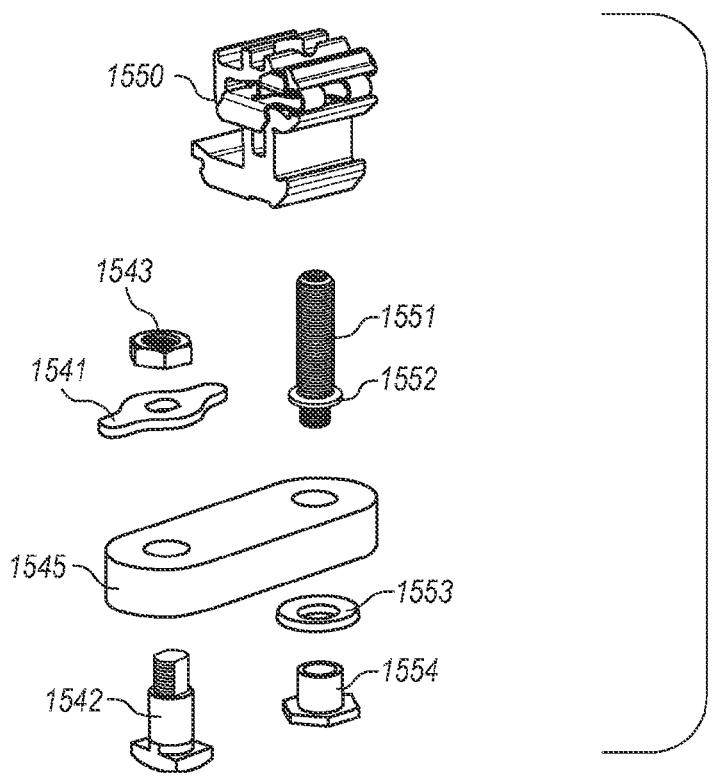

In various embodiments, and as shown in FIG. 36, cam 1542 may include a stem that passes completely through arm portion 1545. The stem may have a rounded portion for rotating within the opening in arm portion 1545, and may terminate in a threaded end that allows attachment of lever 1541 and locking nut 1543 after the stem has passed through arm 1545. The threaded portion may include a pair of flat surfaces that act as a key fitting into a reciprocal opening in lever 1541 so that when torque is applied to lever 1541, stem and by extension cam 1542, will rotate equally.

Arm portion 1545 may also include photovoltaic module connector 1550. In various embodiments, this will be located an opposite end of arm 1545 from lever 1541 so as not to interfere with the rotation of lever 1541, and to provide greater flexibility in the positioning of PV modules. As shown in the Figures, module connector 1550 is a rock-it connector, however, it should be appreciated that a clamping connector or other type of connector could be used with the various embodiments of the invention.

Connector 1550 is supported at an elevated height above arm 1545 by threaded stud 1551. In various embodiments, threaded stud 1551 includes stop washer 1552 that limits the depth that stud 1551 can penetrate into arm 1545. As shown in FIG. 36, base 1554 and washer 1553 may receive the bottom threaded portion of stud 1551 inside of arm 1545 so that stud 1551 remains securely coupled to arm 1545 but is free to rotate within arm 1545. Also, the upper portion of threaded stud 1551 may be received by a threaded opening formed within connector 1550. This will enable the distance between arm 1545 and connector 1550, and by extension the distance between two PV modules and a roof surface, to be adjusted by simply rotating either connector 1550 or threaded stud 1551.

Figure 37:
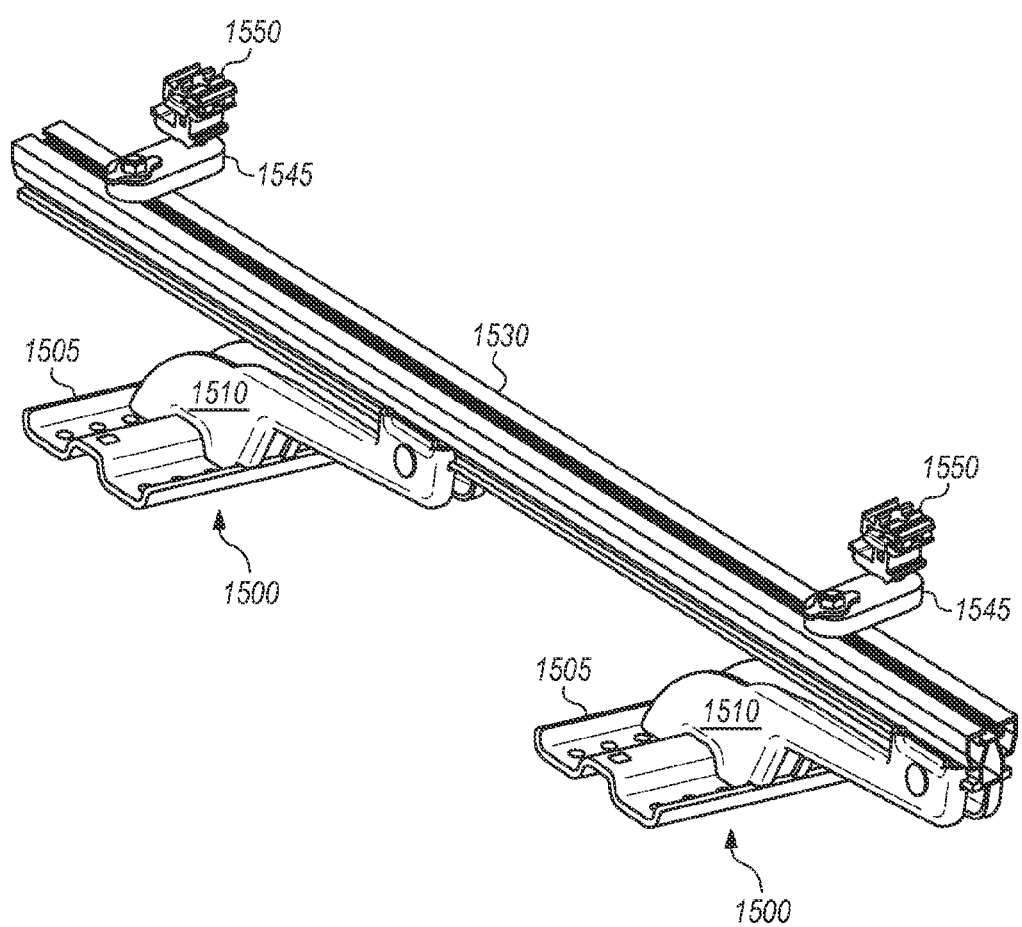
FIG. 37 is a perspective view of a section of rail supporting two photovoltaic module coupling devices with the photovoltaic mounting systems illustrated in FIG. 32.

FIG. 37 illustrates two systems 1500 supporting a long section of rail 1530. Typically, though not necessarily, these systems would be aligned along a North-South line running from the roof eave to the roof ridge so that both systems are connected to the same roof rafter. In a standard array, there would be several systems like that shown in FIG. 37, roughly spaced apart in an array by module length or module width depending on whether the modules are oriented in landscape or portrait orientation respectively. Furthermore, it should be appreciated that although there are only two systems 1500 supporting rail 1530 in FIG. 37, rail 1530 could be sufficiently long to warrant having 3 or more systems supporting it. Alternatively, rail 1530 could be broken into several smaller discrete sections, with one section spanning every other module or every two adjacent modules.

Figure 38:
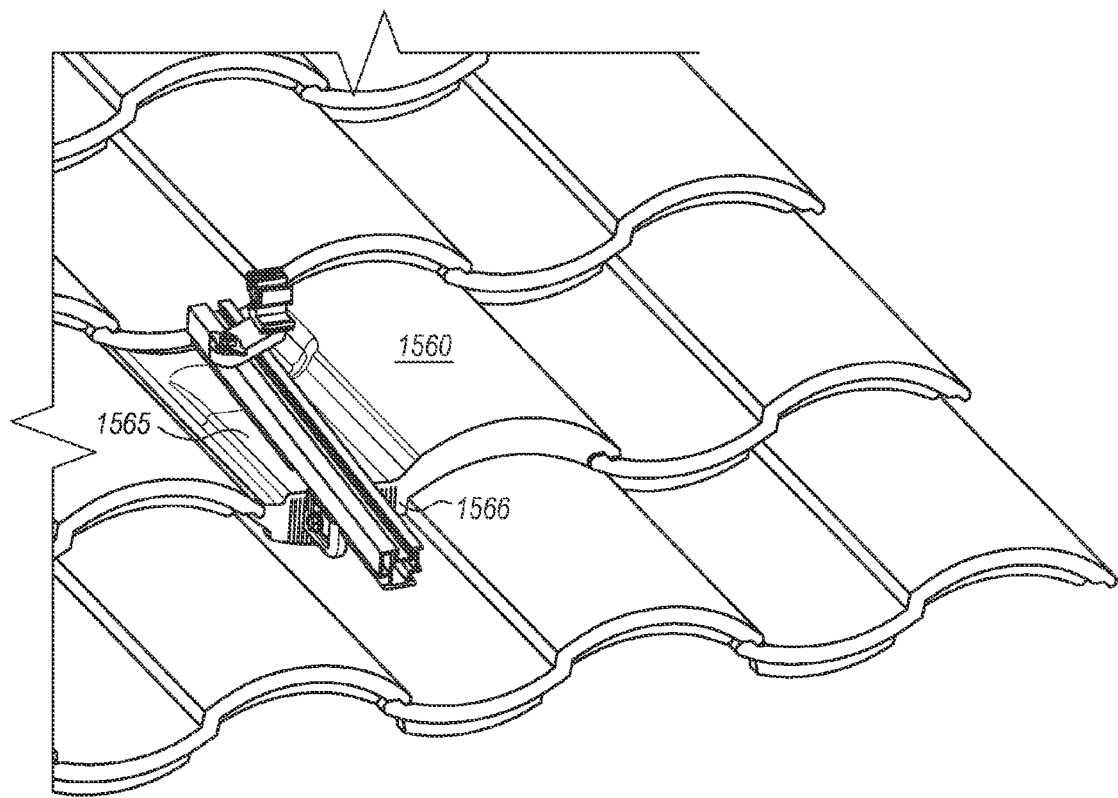
FIG. 38 is a perspective view of a section of curved tile roof including the photovoltaic mounting system of FIG. 32.

FIG. 38 illustrates the system of FIGS. 32-37 installed in a section of tile roof. Base portion 1505 and the bottom part of hook 1510 are covered by flashing portion 1560 and therefore are not visible in the Figure. Flashing portion 1560 is a sheet of metal or plastic material that is pre-formed to match the contour of the surrounding tile array. Also, flashing portion 1560 includes raised portion 1565 that has an outlet through which flanges 1518A and 1518B pass. As with other embodiments, the system shown in FIG. 38 includes plug or vertical portion 1566 that closes the opening between flashing portion 1560 and the next down-roof tile—the same opening through which flanges 1518A and 1518B pass.

In various embodiments, plug or vertical portion 1566 comprises a section of semi-compressible material, at least a portion of which includes a several vertical slots that allow flanges 1518A and 1518B to pass through while substantially sealing the remainder of the opening. Alternatively, flashing 1560 may include an integral vertical portion, part of which includes stamped or cut-out vertical slots that fit around flanges 1518A, 1518B. In still a further alternative, the slotted portion could be formed form a separate plug while the solid portion (e.g., the portion that contacts the raised half of the next down-roof tile) could be integrated into flashing 1560. All these variations are within the spirit and scope of the invention.

The embodiments of the present inventions are not to be limited in scope by the specific embodiments described herein. For example, although many of the embodiments disclosed herein have been described with reference to sloped tile roofs, the principles herein may be equally applicable to other types of roofs. Indeed, various modifications of the embodiments of the present inventions, in addition to those described herein, will be apparent to those of ordinary skill in the art from the foregoing description and accompanying drawings and claims. Thus, such modifications are intended to fall within the scope of this invention. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, this disclosure should be construed in view of the full breath and spirit of the embodiments of the present inventions as disclosed herein and claimed below.

The invention claimed is:

1. A system for mounting photovoltaic modules on a tile roof comprising:
   a mounting bracket, including a base portion with at least one through-hole formed therein for attaching to a roof deck and a projecting portion configured for attaching one or more photovoltaic module mounting components;
   a flashing support member having a flat roof-facing surface, and a curved array-facing surface, wherein the curved array-facing surface at least partially mimics a contour of a roof tile and includes a plurality of slots formed therein to allow the projecting portion of the mounting bracket to pass through at different positions; and
   a flashing portion having an elastic opening in a surface thereof, said opening adapted to permit the mounting bracket to pass through, wherein the flashing portion is comprised of a material capable of conforming to contours of the flashing support member and four surrounding tiles.

2. The system of claim 1, further comprising a photovoltaic module connector coupled to the projecting portion of the mounting bracket.

3. The system of claim 2, wherein the photovoltaic module connector comprises rock-it connector.

4. The system of claim 2, wherein the photovoltaic module connector comprises a clamping connector.

5. The system of claim 2, further comprising an adapter and arm member coupling the photovoltaic module connector to the projecting portion of the mounting bracket.

6. The system of claim 2, further comprising a rail member and a rail bracket coupling the photovoltaic module connector to the projecting portion of the mounting bracket.

7. A system for mounting photovoltaic modules comprising:
   a mounting bracket, including a base portion with at least one through-hole formed therein for attaching to a roof deck and a projecting portion configured for attaching one or more photovoltaic module mounting components;
   a flashing support member pre-formed to partially mimic a contour of a roof tile and including a plurality of slots formed therein to allow the projecting portion of the mounting bracket to pass through at different locations;
   a flashing portion having at least one opening formed in a surface thereof, said opening adapted to permit the projecting portion to pass through; and
   a flashing boot having a flexible aperture formed therein, and adapted to fit over the projecting portion thereby creating a seal between the boot and the projecting portion and between the boot and the flashing portion.

8. The system of claim 7, further comprising a photovoltaic module connector coupled to the projecting portion of the mounting bracket.

9. The system of claim 8, wherein the photovoltaic module connector comprises rock-it connector.

10. The system of claim 8, wherein the photovoltaic module connector comprises a clamping connector.

11. The system of claim 8, further comprising an arm member coupling the photovoltaic module support to the projecting portion of the mounting bracket.

12. The system of claim 8, further comprising a rail member coupling the photovoltaic module support to the projecting portion of the mounting bracket.

13. The system of claim 7, wherein the flashing portion is pre-formed to match a contour of the flashing support and adjacent roof tiles.

14. The system of claim 7, wherein the flashing portion is comprised of a material capable of conforming to contours of the flashing support member and four surrounding tiles.

* * * * *